US012151497B2

(12) United States Patent
Kocak et al.

(10) Patent No.: US 12,151,497 B2
(45) **Date of Patent: *Nov. 26, 2024**

(54) HEAT SENSITIVE RECORDING MATERIAL WITH NON-PHENOLIC COLOR DEVELOPERS

(71) Applicant: SOLENIS TECHNOLOGIES, L.P., Wilmington, DE (US)

(72) Inventors: Erkan Kocak, Wilmington, DE (US); Frank Bachmann, Freiburg (DE); Priti Kulkarni, Ludwigshafen am Rhein (DE); Robert Montgomery O'Neil, Urmston (GB)

(73) Assignee: Solenis Technologies, L.P., Wilmington, DE (US)

( * ) Notice: Subject to any disclaimer, the term of this patent is extended or adjusted under 35 U.S.C. 154(b) by 616 days.

This patent is subject to a terminal disclaimer.

(21) Appl. No.: 17/004,023

(22) Filed: Aug. 27, 2020

(65) Prior Publication Data

US 2021/0060994 A1 Mar. 4, 2021

Related U.S. Application Data

(60) Provisional application No. 62/894,041, filed on Aug. 30, 2019.

(51) Int. Cl.
*B41M 5/333* (2006.01)

(52) U.S. Cl.
CPC ....... *B41M 5/3333* (2013.01); *B41M 2205/04* (2013.01)

(58) Field of Classification Search
CPC .. B41M 5/333; B41M 5/3333; B41M 5/3335; B41M 5/3336
See application file for complete search history.

(56) References Cited

U.S. PATENT DOCUMENTS

| | | | |
|---|---|---|---|
| 6,624,117 B1 | 9/2003 | Heneghan et al. | |
| 11,512,048 B2 * | 11/2022 | Feiler | C07C 311/21 |
| 2015/0284321 A1 | 10/2015 | Sakai et al. | |
| 2019/0077178 A1 | 3/2019 | Brasch et al. | |
| 2020/0086669 A1 | 3/2020 | Sakai et al. | |
| 2021/0340099 A1 | 11/2021 | Kinishi et al. | |

FOREIGN PATENT DOCUMENTS

| | | | |
|---|---|---|---|
| BR | 112015011253 | A2 | 7/2017 |
| CN | 1330593 | A | 1/2002 |
| CN | 112601668 | A | 4/2021 |
| EP | 0573048 | A2 | 12/1993 |
| EP | 0573048 | B1 | 10/1999 |
| EP | 1140515 | B1 | 9/2004 |
| EP | 3533619 | A1 | 9/2019 |
| RU | 2677706 | C1 | 1/2019 |
| WO | 2014/080615 | A1 | 5/2014 |
| WO | 2018/225663 | A1 | 12/2018 |
| WO | 2019/044462 | A1 | 3/2019 |

OTHER PUBLICATIONS

ISA/US, International Search Report and Written Opinion issued in Int. Appl. No. PCT/US2020/048098 mailed Feb. 12, 2021.

* cited by examiner

*Primary Examiner* — Gerard Higgins
(74) *Attorney, Agent, or Firm* — Lorenz & Kopf, LLP

(57) ABSTRACT

Heat sensitive recording material, recording sheets formed from heat sensitive recording material, and methods for forming images using heat sensitive recording material are provided. An exemplary heat sensitive recording material includes a color forming compound, a first non-phenolic color developer, and a second non-phenolic color developer.

19 Claims, No Drawings

HEAT SENSITIVE RECORDING MATERIAL WITH NON-PHENOLIC COLOR DEVELOPERS

CROSS-REFERENCE TO RELATED APPLICATION

This application claims the benefit of U.S. Provisional Application No. 62/894,041, filed Aug. 30, 2019, which is incorporated herein by reference in its entirety.

BACKGROUND

Embodiments described herein relate to heat sensitive recording material including a combination of a first non-phenolic color developer and a second non-phenolic color developer, recording sheets formed from such heat sensitive recording material, and methods for forming images using such heat sensitive recording material.

For thermographic printing of point of sales receipts, so called thermal paper is used. Such thermal paper forms a colored image by heating. Thermal paper is typically composed of three main components: the color former; the sensitizer; and the color developer. During processing the colorless color former is converted into to the black chromophore which is stabilized by the color developer through forming a complex. The widely used color developer bisphenol A is inexpensive and technically sufficient but is suspected of endocrine disruption activity in both humans and in the environment and may be classified as “toxic for reproduction” in certain jurisdictions. For example, bisphenol A will be restricted in thermal papers in the European market from January 2020. Another phenolic color developer, bisphenol S is also under investigation for environmental safety.

Among non-phenolic color developers in commercial use, sulfonyl urea derivatives, such as described in EP 0526072 or in WO00/35679, for example N-p-toluenesulfonyl-N'-3-(p-toluenesulfonyloxy)phenylurea, or urea derivatives, such as described in EP 2923851, may offer an alternative to the widely used phenolic products. However, despite being technically viable alternatives to phenolic color developers, the synthesis of such urea derivatives requires the use of specialty and semi-specialty raw materials. Consequently, urea derivatives are not ideal in cost-effectiveness terms for widespread use in Point Of Sales and/or economy grades of thermal paper.

JP 2016-083858 A1 describes a further alternative of a thermosensitive recording material comprising a color developer that is prepared in a three-step procedure.

Accordingly, it is desirable to provide a non-phenolic color developer for use in heat sensitive recording materials that is both a technically suitable and cost-effective alternative to currently available phenolic and non-phenolic color developers.

SUMMARY

Heat sensitive recording material, recording sheets formed from heat sensitive recording material, and methods for forming images using heat sensitive recording material are provided. An exemplary heat sensitive recording material includes a color forming compound, a first non-phenolic color developer, and a second non-phenolic color developer.

An exemplary recording sheet includes a support and a recording composition layer on the support, wherein the recording composition is formed from a color forming compound, a first non-phenolic color developer, and a second non-phenolic color developer.

An exemplary method for forming an image includes providing a heat sensitive recording material of a color forming compound, a first non-phenolic color developer, and a second non-phenolic color developer.

In exemplary embodiments, the first non-phenolic color developer is of the formula (I)

(I)

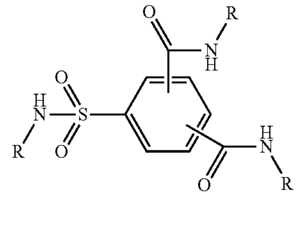

wherein R and $R_1$ are each, independently of each other, hydrogen; $C_1$-$C_{18}$-alkyl; $C_1$-$C_8$-alkoxy-$C_1$-$C_8$-alkyl; $(R_9)_2N$—$C_1$-$C_8$-alkyl, wherein $R_9$ stands for $C_1$-$C_8$-alkyl or $C_5$-$C_6$-cycloalkyl; or a radical of formula (II)

(II)

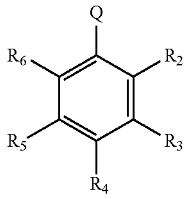

wherein $R_2$, $R_3$, $R_4$, $R_5$, $R_6$ are each, independently of each other, hydrogen; $C_1$-$C_8$-alkyl; —NH—C(═O)—$R_7$ or —C(═O)—NH—$R_7$, wherein $R_7$ stands for $C_1$-$C_8$-alkyl; —C(═O)O$R_5$, wherein $R_8$ stands for $C_1$-$C_8$-alkyl; halogen (such as such as fluorine, chlorine, bromine, or chlorine); or wherein $R_2$ and $R_3$, or $R_4$ and $R_8$ or both, or wherein $R_3$ and $R_4$, or $R_5$ and $R_6$ or both, or wherein ($R_2$ and $R_3$) and ($R_5$ and $R_6$), stand together for a hydrocarbon diradical with three or four carbon atoms (such as trimethylene, tetramethylene, propenylene, 2-butenylen, or 1,3-butadienylen), and wherein Q stands for a single bond or $C_1$-$C_8$-alkylene, which can be branched or unbranched, and wherein the $C_1$-$C_8$-alkylene includes a main chain containing one or more oxygen atoms between two carbon atoms when the $C_1$-$C_8$-alkylene includes more than two carbon atoms.

In an exemplary embodiment, when $R_8$ stands for a halogen, the halogen is chlorine. Exemplary embodiments of Q include —$CH_2$—, —$CH_2$—$CH_2$—, —$CH_2$—O—, —$CH_2$—$CH_2$—O—, —$CH_2$—$CH_2$—$CH_2$—, —$CH_2$—$CH_2$—$CH_2$—$CH_2$—, —C(Me)H—, —C(Et)H—, —C(n-Pr)H—, —C(i-Pr)H—, —C(n-Bu)H—, —C(i-Bu)H—, —C(sec-Bu)H—, —C(tert-Bu)H—, —C(Me)H$CH_2$—, —$CMe_2CH_2$—, or, in particular embodiments, —$CH_2$—, —$CH_2$—$CH_2$—, —$CH_2$—$CH_2$—O— and —C(Me)H—.

In certain embodiments, the second non-phenolic color developer is a compound selected from the group consisting of: (i) a compound represented by the following formula (N-I):

(N-I)

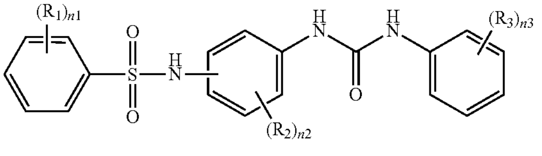

wherein $R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group, $NHCOR_5$, an optionally substituted phenyl group, or an optionally substituted benzyl group;

wherein $R_4$ represents a hydrogen atom, a phenyl group, a benzyl group, or a $C_1$-$C_6$ alkyl group;

wherein $R_8$ represents a $C_1$-$C_6$ alkyl group;

wherein n1 and n3 each independently represents any integer of 1 to 5; and wherein n2 represents any integer of 1 to 4; and (ii) a compound represented by the following formula (N-II):

(N-II)

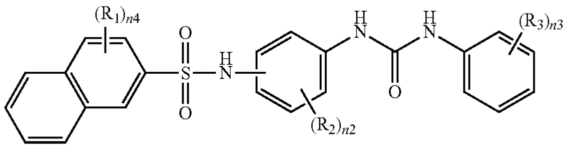

wherein $R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group, $NHCOR_5$, an optionally substituted phenyl group, or an optionally substituted benzyl group;

wherein n2 represents any integer of 1 to 4;

wherein n3 represents any integer of 1 to 5; and wherein n4 represents any integer of 1 to 7; and (iii) a compound represented by the following formula (N-III):

(N-III)

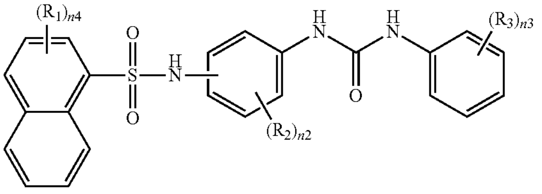

wherein $R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group, $NHCOR_5$, an optionally substituted phenyl group, or an optionally substituted benzyl group;

wherein n2 represents any integer of 1 to 4;

wherein n3 represents any integer of 1 to 5; and wherein n4 represents any integer of 1 to 7.

In other embodiments, the second non-phenolic color developer is a compound of the formula (P-I)

(P-I)

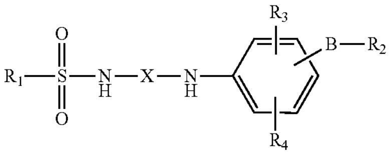

wherein R1 is unsubstituted or substituted phenyl, or naphthyl, wherein R3 and R4 independently of each other are hydrogen, $C_1$-$C_6$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy, $C_1$-$C_8$ alkylsulphonyl, halogen, phenyl, phenoxy or phenoxycarbonyl, wherein X is a group of the formula

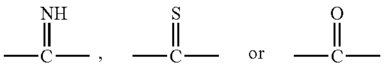

wherein B is a linking group of formula $—O—SO_2—$, $—SO_2—O—$, $—SO_2—NH—$, or $—CO—NH—SO_2$, and wherein $R_2$ is phenyl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen; or $R_2$ is naphthyl or benzyl, which is substituted by $C_1$-$C_4$ alkyl or halogen, with the proviso, that, if B is not a linking group of formula $—O—SO_2—$, then $R_2$ is unsubstituted or substituted phenyl, or naphthyl.

In other embodiments, the second non-phenolic color developer is a compound of the formula (Q-I)

(Q-I)

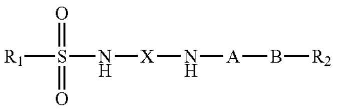

wherein $R_1$ is phenyl or naphthyl, which is unsubstituted or substituted by $C_1$-$C_8$ alkyl, $C_1$-$C_8$-alkoxy or halogen, or $R_1$ is $C_1$-$C_{20}$ alkyl, which can be unsubstituted or substituted by $C_1$-$C_8$-alkoxy or halogen;

wherein X is a group of the formula

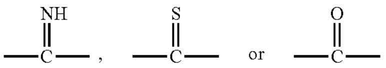

wherein A is unsubstituted or substituted phenylene, naphthylene or $C_1$-$C_{12}$ alkylene, or is an unsubstituted or substituted heterocyclic group;

wherein B is a linking group of formula $—O—SO_2—$, $—SO_2—O—$, $—NH—SO_2—$, $—SO_2—NH—$, $—S—SO_2—$, $—O—CO—NH—$, $—NH—CO—$, $—NH—CO—O—$, $—S—CO—NH—$, $—S—CS—NH—$, $—CO—NH—SO_2—$, $—O—CO—NH—$ $SO_2$—, —NH═CH—, —CO—NH—CO—, —S—, —CO—, —O—, —$SO_2$—NH—CO—, —O—CO—O—, or —O—PO—$(OR_2)_2$; and wherein $R_2$ is aryl, which is unsubstituted or substituted by $C_1$-$C_6$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen; or $R_2$ is benzyl, which is unsubstituted or substituted by $C_1$-$C_6$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen, or $R_2$ is $C_1$-$C_{20}$ alkyl, which is unsubstituted or substituted by $C_1$-$C_6$ alkoxy, halogen, phenyl, or naphthyl, with the proviso, that, if B is not a linking group of formula —O—$SO_2$—, then $R_2$ is unsubstituted or substituted phenyl, naphthyl, or $C_1$-$C_8$ alkyl and that, if B is —O—, then $R_2$ is not alkyl, and with the further proviso that, if B stands for —O—$SO_2$— or —$SO_2$—O—, then $R_2$ is not $C_1$-$C_{20}$ alkyl.

As described herein, the dynamic sensitivity of the first non-phenolic color developer is improved when used in combination with the second non-phenolic color developer. Further, as described herein, the maximum optical density image of the first non-phenolic color developer is improved when used in combination with the second non-phenolic color developer. Also, as described herein, the recorded image stability of the first non-phenolic color developer is improved when used in combination with the second non-phenolic color developer. The improvement is significant with respect to plasticizer migration from top or back side of the thermosensitive media.

Further, in the case of 1-[2-(benzenesulfonylamido)-phenyl]-3-phenylurea, the recorded image stability of the second non-phenolic color developer is improved when used in combination with the first non-phenolic color developer. The improvement is significant with respect to water resistance, oil resistance, and plasticizer migration from top or back side of the thermosensitive media. Essentially all preservations of not were improved by the combination.

In the case of [3-(p-tolylsulfonylcarbamoylamino)phenyl] 4-methylbenzenesulfonate, the recorded image stability of the second non-phenolic color developer is improved with respect to water resistance and heat resistance, light resistance as well.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely illustrative in nature and is not intended to limit the embodiments of the subject matter or the application and uses of such embodiments. As used herein, the word “exemplary” means “serving as an example, instance, or illustration.” Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As described herein, an exemplary heat sensitive recording material includes a non-phenolic color developer combination including a first non-phenolic color developer and a second non-phenolic color developer. In certain embodiments, the non-phenolic color developer combination consists essentially of the first non-phenolic color developer and the second non-phenolic color developer. In other embodiments, the non-phenolic color developer combination consists of the first non-phenolic color developer and the second non-phenolic color developer. In yet other embodiments, the non-phenolic color developer combination includes the first non-phenolic color developer, the second non-phenolic color developer, and additional non-phenolic color developer(s).

Further, an exemplary heat sensitive recording material may include a sensitizer or be free of sensitizer. In an exemplary embodiment, the heat sensitive recording material includes benzyl 2-naphtyl ether (CAS No. 613-62-7) as the sensitizer.

In exemplary embodiments, the first non-phenolic color developer is 5-(N-3-methylphenyl-sulfonylamido)-(N',N"-bis-(3-methylphenyl)-isophthalic acid diamide, also referred to herein as Pergafast-425 or PF-425. In exemplary embodiments, the second non-phenolic color developer is 1-[2-(benzenesulfonylamido)-phenyl]-3-phenylurea (CAS No. 215917-77-4), also known as NKK-1304. In other exemplary embodiments, the second non-phenolic color developer is [3-(p-tolylsulfonylcarbamoylamino)phenyl]4-methylbenzenesulfonate (CAS No. 232938-43-1), also known as Pergafast-201 or PF-201.

As described herein, the dynamic sensitivity of the first non-phenolic color developer is improved when used in combination with the second non-phenolic color developer. Further, as described herein, the maximum optical density image of the first non-phenolic color developer is improved when used in combination with the second non-phenolic color developer. Also, as described herein, the recorded image stability of the first non-phenolic color developer is improved when used in combination with the second non-phenolic color developer. The improvement is significant with respect to plasticizer migration from top or back side of the thermosensitive media.

Further, in the case of 1-[2-(benzenesulfonylamido)-phenyl]-3-phenylurea, the recorded image stability of the second non-phenolic color developer is improved when used in combination with the first non-phenolic color developer. The improvement is significant with respect to water resistance, oil resistance, and plasticizer migration from top or back side of the thermosensitive media. Essentially all preservations of not were improved by the combination.

In the case of [3-(p-tolylsulfonylcarbamoylamino)phenyl] 4-methylbenzenesulfonate, the recorded image stability of the second non-phenolic color developer is improved with respect to water resistance and heat resistance, light resistance as well.

In certain embodiments, the first non-phenolic color developer to second non-phenolic color developer ratio is from 10:90 to 90:10. For example, a bottom limit to the first non-phenolic color developer to second non-phenolic color developer ratio is 10:90, 15:85, 20:80, 25:75, 30:70, 35:65, 40:60, 45:55, 50:50, 55:45, 60:40, 65:35, 70:30, 75:25, 80:20, or 85:15. Further, an upper limit to the first non-phenolic color developer to second non-phenolic color developer ratio is 90:10, 85:15, 80:20, 75:25, 70:30, 65:35, 60:40, 55:45, 50:50, 45:55, 40:60, 35:65, 30:70, 25:75, 20:80, or 15:85. All ratios are provided in dry proportion of both color developers mixture.

First Non-Phenolic Color Developer

In an exemplary embodiment, the first non-phenolic color developer is of the formula (I)

(I)

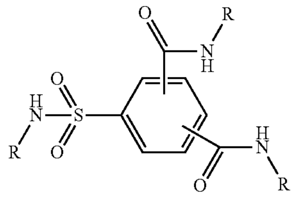

wherein R and $R_1$ are each, independently of each other, hydrogen; $C_1$-$C_{18}$-alkyl; $C_1$-$C_8$-alkoxy-$C_1$-$C_8$-alkyl; $(R_9)_2N$—$C_1$-$C_8$-alkyl, wherein $R_9$ stands for $C_1$-$C_8$-alkyl or $C_5$-$C_6$-cycloalkyl; or a radical of formula (II)

(II)

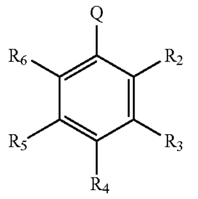

wherein $R_2$, $R_3$, $R_4$, $R_5$, $R_6$ are each, independently of each other, hydrogen; $C_1$-$C_8$-alkyl; —NH—C(═O)—$R_7$ or —C(═O)—NH—$R_7$, wherein $R_7$ stands for $C_1$-$C_8$-alkyl; —C(═O)O$R_5$, wherein $R_8$ stands for $C_1$-$C_8$-alkyl; halogen (such as such as fluorine, chlorine, bromine, or chlorine); or wherein $R_2$ and $R_3$, or $R_4$ and $R_8$ or both, or wherein $R_3$ and $R_4$, or $R_5$ and $R_6$ or both, or wherein ($R_2$ and $R_3$) and ($R_5$ and $R_6$), stand together for a hydrocarbon diradical with three or four carbon atoms (such as trimethylene, tetramethylene, propenylene, 2-butenylen, or 1,3-butadienylen), and wherein Q stands for a single bond or $C_1$-$C_8$-alkylene, which can be branched or unbranched, and wherein the $C_1$-$C_8$-alkylene includes a main chain containing one or more oxygen atoms between two carbon atoms when the $C_1$-$C_8$-alkylene includes more than two carbon atoms.

In an exemplary embodiment, when $R_8$ stands for a halogen, the halogen is chlorine.

Exemplary embodiments of Q include —$CH_2$—, —$CH_2$—$CH_2$—, —$CH_2$—O—, —$CH_2$—$CH_2$—O—, —$CH_2$—$CH_2$—$CH_2$—, —$CH_2$—$CH_2$—$CH_2$—$CH_2$—, —C(Me)H—, —C(Et)H—, —C(n-Pr)H—, —C(i-Pr)H—, —C(n-Bu)H—, —C(i-Bu)H—, —C(sec-Bu)H—, —C(tert-Bu)H—, —C(Me)H$CH_2$—, —$CMe_2CH_2$—, or, in particular embodiments, —$CH_2$—, —$CH_2$—$CH_2$—, —$CH_2$—$CH_2$—O— and —C(Me)H—.

In exemplary embodiments, a $C_1$-$C_{18}$-alkyl stands for methyl, ethyl, propyl, isopropyl, n-butyl, isobutyl, sec-butyl, tert-butyl, amyl, tert-amyl (1,1-dimethylpropyl), 1,1,3,3-tetramethylbutyl, n-hexyl, 2-methylpentyl, neopentyl, n-heptyl, 2-ethyl-hexyl or n-octyl, n-nonyl, n-decyl, n-undecyl, ndodecyl, n-tridecyl, n-tetradecyl, n-pentadecyl, n-hexadecyl, n-heptadecyl, or n-octadecyl.

In exemplary embodiments, a $C_1$-$C_8$-alkyl is methyl, ethyl, propyl, isopropyl, n-butyl, isobutyl, sec-butyl, tert-butyl, amyl, tert-amyl (1,1-dimethylpropyl), 1,1,3,3-tetramethylbutyl, n-hexyl, 2-methylpentyl, neopentyl, n-heptyl, 2-ethyl-hexyl or n-octyl, or tridecyl. In particular embodiments, a $C_1$-$C_8$-alkyl is methyl, ethyl, n-propyl, isopropyl, n-butyl, isobutyl, sec-butyl, tert-butyl, 2-ethyl-hexyl or tridecyl.

In exemplary embodiments, $C_1$-$C_8$-alkoxy stands for methoxy, ethoxy, n-propoxy, isopropoxy, n-butyloxy, n-pentyloxy, n-hexyloxy, n-heptyloxy, or n-octyloxy. In particular embodiments, $C_1$-$C_8$-alkoxy stands for $C_1$-$C_6$-alkoxy, such as methoxy, ethoxy, n-propoxy, isopropoxy, n-butyloxy, or n-hexyloxy.

In exemplary embodiments, $C_1$-$C_8$-alkoxy-$C_1$-$C_8$-alkyl stands for methoxymethyl, ethoxymethyl, n-propoxymethyl, isopropoxymethyl, n-butyloxymethyl, n-pentyloxymethyl, n-hexyloxymethyl, n-heptyloxymethyl, n-octyloxymethyl, methoxyethyl, ethoxyethyl, n-propoxyethyl, isopropoxyethyl, n-butyloxyethyl, n-pentyloxyethyl, n-hexyloxyethyl, n-heptyloxyethyl, n-octyloxyethyl, methoxymethyl, 1-methoxyethyl, 2-methoxyethyl, 3-methoxy-n-propyl, 1-methoxy-2-propyl, 4-methoxy-n-butyl, 5-methoxy-n-pentyl, 6-methoxy-n-hexyl, 7-methoxy-n-heptyl, 8-methoxy or n-octyl. In particular embodiments, $C_1$-$C_8$-alkoxy-$C_1$-$C_8$-alkyl stands for 2-methoxyethyl.

In exemplary embodiments, $C_5$—C-cycloalkyl stands for cyclopentyl or cyclohexyl. In particular embodiments, $C_5$-$C_6$-cycloalkyl stands for cyclohexyl.

In exemplary embodiments, $(R_9)_2N$—$C_1$-$C_8$-alkyl groups are 2-(dimethylamino)-methyl, 2-(dimethylamino)-ethyl, 2-(diethylamino)-ethyl, 2-(diisopropylamino)-ethyl, 2-(n-propylamino)-ethyl, 3-(dimethylamino)-propyl, or 3-(cyclohexylamino)-propyl.

In certain embodiments wherein $R_2$ and $R_3$, or $R_4$ and $R_8$ or both, or wherein $R_3$ and $R_4$, or $R_5$ and $R_6$ or both, or wherein ($R_2$ and $R_3$) and ($R_5$ and $R_6$), stand together for a hydrocarbon diradical with three or four carbon atoms (such as trimethylene, tetramethylene, propenylene, 2-butenylen, or 1,3-butadienylen), $R_2$ and $R_3$ together stand for tetramethylene or $R_2$ and $R_3$ together stand for tetramethylene.

In exemplary embodiments, the radical of formula (II) is phenyl, benzyl, 3-methylphenyl, 2,6-diethylphenyl, oisopropylphenyl, p-acetamidophenyl, 1-phenylethyl, 2-phenylethyl, 2-phenoxyethyl, 1-tetralino, or 2-tetralino.

In certain exemplary embodiments, the first non-phenolic color developer is of the formula (Ia)

(Ia)

(Ia)

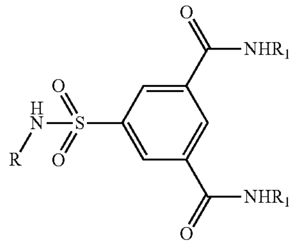

or the first non-phenolic color developer is of the formula (Ib)

(Ib)

(Ib)

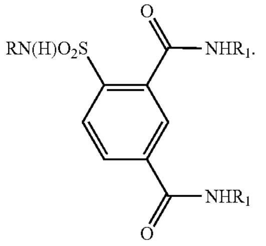

Exemplary first non-phenolic color developers of the formula (Ia) include 5-(N-benzyl-sulfonylamido)-(N',N"-dibenzyl)-isophthalic acid-diamide, 5-(N-3-methylphenyl-sulfonylamido)-(N',N"-bis-(3-methylphenyl)-isophthalic acid-diamide, 5-(N-2,6-diethylphenyl-sulfonylamido)-(N',N"-bis-(2,6-diethylphenyl)-isophthalic acid-diamide, 5-(N-phenyl-sulfonylamido)-(N',N"-bisphenyl)-isophthalic acid-diamide, 5-(N-o-isopropyl-phenyl-sulfonylamido)-(N',N"-bis-(o-isopropylphenyl)-isophthalic acid-diamide, 5-(N-p-acetamido-phenyl-sulfonylamido)-(N',N"-bis-(p-acetamido-phenyl)-isophthalic acid-diamide, 5-(N-1-tetralino-sulfonylamido)-(N',N"-bis-(1-tetralino)-isophthalic acid-diamide, 5-(N-3-methylphenyl-sulfonylamido)-(N',N"-bis-(3-methylphenyl)-isophthalic acid-diamide, 5-(N-1-phenylethyl-sulfonylamido)-(N',N"-bis-(1-phenylethyl)-isophthalic acid-diamide, 5-(N-2-phenylethyl-sulfonylamido)-(N',N"-bis-(2-phenylethyl)-isophthalic acid-diamide, 5-(N-2,6-diethylphenyl-sulfonylamido)-(N',N"-bis-(2,6-diethylphenyl)-isophthalic acid-diamide, 5-(N-n-butyl-sulfonylamido)-(N',N"-di-n-butyl-isophthalic acid-diamide, 5-(N-2-ethylhexyl-sulfonylamido)-(N',N"-di-2-ethylhexylisophthalic acid-diamide, 5-(N-benzyl-sulfonylamido)-(N',N"-diphenyl)-isophthalic acid-diamide, 5-(N-phenyl-sulfonylamido)-(N',N"-dibenzyl)-isophthalic acid-diamide, 5-(N-benzylsulfonylamido)-(N',N"-bis-(3-methyl-phenyl)-isophthalic acid-diamide, 5-(N-butyl-sulfonylamido)-(N',N"-bis-(3-methyl-phenyl)-isophthalic acid-diamide, 5-(N-1-phenyl-ethyl-sulfonylamido)-(N',N"-bis-(3-methyl-phenyl)-isophthalic acid-diamide, 5-(N-2-phenyl-ethyl-sulfonylamido)-(N',N"-bis-(3-methyl-phenyl)-isophthalic acid-diamide, 5-(N-2-methoxy-ethyl-sulfonylamido)-(N',N"-bis-(3-methyl-phenyl)-isophthalic acid-diamide, 5-(N-n-octyl-sulfonylamido)-(N',N"-bis-(3-methyl-phenyl)-isophthalic acid-diamide, 5-(N-benzyl-sulfonylamido)-(N',N"-bis-(2,6-diethyl-phenyl)-isophthalic acid-diamide, 5-(N-n-octyl-sulfonylamido)-(N',N"-bis-(2,6-diethyl-phenyl)-isophthalic acid-diamide, and 5-(N-2-phenoxy-ethyl-sulfonylamido)-(N',N"-bis-(2,6-diethyl-phenyl)-isophthalic acid-diamide.

In certain exemplary embodiments, the heat sensitive recording material further includes a bisamide, such as a bisamide of the formula (Ic)

(Ic)

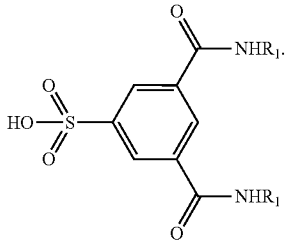

In particular exemplary embodiments, the first non-phenolic color developer is of the formula (Ia), and the heat sensitive recording material includes a bisamide of the formula (Ic), and the amount of bisamide (Ic) is from about 0.01 to about 10 mol-% in relation to the first non-phenolic color developer (Ia).

A further embodiment described herein relates to polymorphic modifications, in particular to 5-(N-3-methylphenyl-sulfonylamido)-(N',N"-bis-(3-methylphenyl)-isophthalic acid diamide, where three different polymorphic modifications were found: an α-modification having a melting point of 211.2° C. (determined using differential scanning colorimetry, DSC), a β-modification having a melting point of 192.2° C. (measured via DSC), and a 7-modification having a melting point of 215.6° C. (measured via DSC).

Second Non-Phenolic Color Developer

In an exemplary embodiment, the second non-phenolic color developer is:

a compound represented by the following formula (I):

(I)

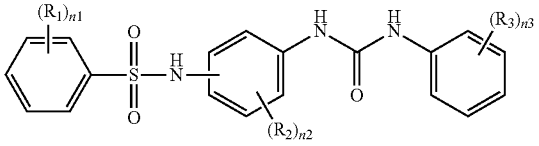

wherein $R_1$ to $R_3$ represent a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group (wherein $R_4$ represents a hydrogen atom, a phenyl group, a benzyl group, or a $C_1$-$C_6$ alkyl group), $NHCOR_5$ (wherein $R_5$ represents a $C_1$-$C_6$ alkyl group), an optionally substituted phenyl group, or an optionally substituted benzyl group; n1 and n3 each independently represent any integer of 1 to 5; and n2 represents any integer of 1 to 4);

a compound represented by the following formula (II):

(II)

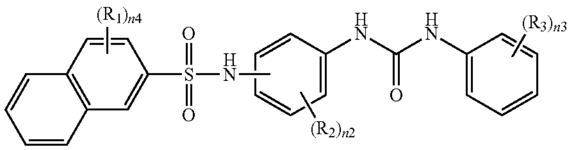

(wherein $R_1$ to $R_3$ represent the same as $R_1$ to $R_3$ defined in the formula (I); n2 and n3 represent the same as n2 and n3 defined in the formula (I); and n4 represents any integer of 1 to 7); and a compound represented by the following formula (III):

(III)

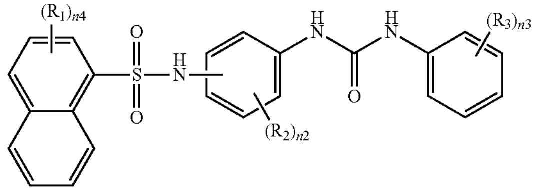

(wherein $R_1$ to $R_3$ represent the same as $R_1$ to $R_3$ defined in the formula (I); and n2, n3 and n4 represent the same as n2, n3 and n4 defined in the formula (I) and the formula (II)).

In certain exemplary embodiments, the formula (I) is the following formula (IV):

(IV)

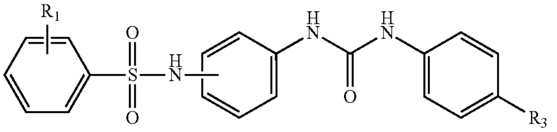

(wherein $R_1$ and $R_3$ represent the same as $R_1$ and $R_3$ defined in the formula (I)).

In certain exemplary embodiments, the formula (I) is the following formula (V):

(V)

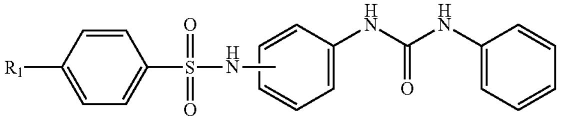

(wherein $R_1$ represents the same as $R_1$ defined in the formula (I)).

In an exemplary embodiment, the second non-phenolic color developer is a benzenesulfonamide compound.

In the formulas (I), (II) and (III), examples of $R_1$ to $R_3$ are selected from:

a hydrogen atom;

a halogen atom such as a fluorine atom, a chlorine atom, a bromine atom or an iodine atom;

a nitro group;

a straight, branched or cyclic $C_1$-$C_6$ alkyl group such as methyl, ethyl, propyl, isopropyl, butyl, isobutyl, sec-butyl, t-butyl, pentyl, isopentyl, neopentyl, hexyl, isohexyl, cyclopropyl, cyclobutyl, 2-methylcyclopropyl, cyclopropylmethyl, cyclopentyl, or cyclohexyl;

a straight, branched or cyclic $C_1$-$C_6$ alkoxy group such as methoxy, ethoxy, propoxy, isopropoxy, butoxy, isobutoxy, sec-butoxy, t-butoxy, pentyloxy, isopentyloxy, hexyloxy, cyclopropoxy, cyclobutoxy, 2-methylcyclopropoxy, cyclopropylmethoxy, cyclopentyloxy, or cyclohexyloxy;

a $C_2$-$C_6$ alkenyl group such as a vinyl group, an allyl group, an isopropenyl group, a 1-propenyl group, a 2-propenyl group, a 1-butenyl group, a 2-butenyl group, a 3-butenyl group, a 1,3-butanedienyl group, or a 2-methyl-2-propenyl group;

a $C_1$-$C_6$ fluoroalkyl group such as a trifluoromethyl group, a perfluoroethyl group, a perfluoropropyl group, a perfluorobutyl group, a perfluorohexyl group, or a perfluorocyclohexyl group;

a $N(R_4)_2$ group (wherein $R_4$ represents a hydrogen atom, a phenyl group, a benzyl group or a $C_1$-$C_6$ alkyl group);

$NHCOR_5$ (wherein $R_5$ represents a $C_1$-$C_6$ alkyl group);

an optionally substituted phenyl group; and an optionally substituted benzyl group.

In exemplary embodiments, for the second non-phenolic color developer, $R_1$ to $R_3$ each represent a hydrogen atom or a straight $C_1$-$C_6$ alkyl group. In particular, $R_1$ may represent a hydrogen atom or a methyl group, and $R_2$ and $R_3$ may each represent a hydrogen atom.

Examples of the $C_1$-$C_6$ alkyl group used as $R_4$ or $R_5$ above for the second non-phenolic color developer include the same as the specific examples of the $C_1$-$C_6$ alkyl group used as $R_1$ above for the second non-phenolic color developer.

Examples of the substituent with which a group is "optionally substituted" include:

a hydroxy group;

a halogen atom such as a fluorine atom, a chlorine atom, a bromine atom, or an iodine atom;

a $C_1$-$C_6$ alkyl group such as a methyl group, an ethyl group, a n-propyl group, an isopropyl group, a n-butyl group, a sec-butyl group, a t-butyl group, a n-pentyl group, an isopentyl group, a neopentyl group, a t-pentyl group, a n-hexyl group, an isohexyl group, a 1-methyl pentyl group, or a 2-methyl pentyl group; and a $C_1$-$C_6$ alkoxy group such as a methoxy group, an ethoxy group, a n-propoxy group, an isopropoxy group, a n-butoxy group, a sec-butoxy group, or a t-butoxy group.

In exemplary embodiments the second non-phenolic color developer is a benzenesulfonamide compound selected from a compound represented by the following formula (I):

(I)

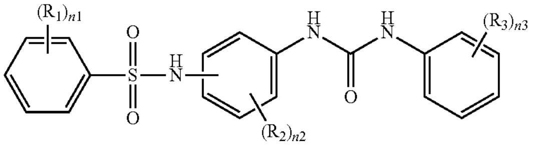

(wherein $R_1$ to $R_3$ and n1 to n3 represent the same as $R_1$ to $R_3$ and n1 to n3 defined in the above, with the proviso that a case where $R_2$ and $R_3$ each represent a hydrogen atom, and $R_1$ represents any of a hydrogen atom, a p-methyl group, a m-methyl group and a p-chloro group is excluded), a compound represented by the following formula (II):

(II)

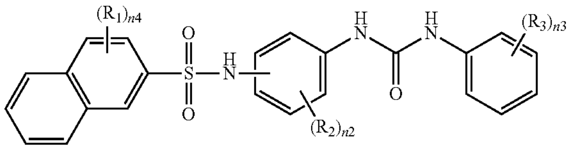

(wherein $R_1$ to $R_3$ represent the same as $R_1$ to $R_3$ defined in the above, n2 and n3 represent the same as n2 and n3 defined in the above, and n4 represents any integer of 1 to 7), and a compound represented by the following formula (III):

(III)

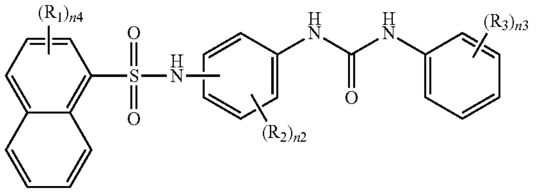

(wherein $R_1$ to $R_3$ represent the same as $R_1$ to $R_3$ defined in the above, and n2, n3 and n4 represent the same as n2, n3 and n4 defined in the above).

Representative examples of the compounds represented by the formulas (I) to (III) of the second non-phenolic color developer include 4-methyl-N-(2-(3-phenylureido)phenyl) benzenesulfonamide and N-(2-(3-phenylureido)phenyl)benzenesulfonamide.

In an exemplary embodiment, the thermosensitive coloring layer of the thermosensitive recording medium comprises a developer having the following formula:

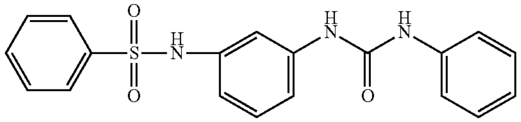 [SMILES: O=C(Nc1ccccc1)Nc1cccc(NS(=O)(=O)c2ccccc2)c1]

This corresponds to the general formula (I) above in which $R_1$, $R_2$ and $R_3$ are all hydrogen atoms.

Second Non-Phenolic Color Developer

In an exemplary embodiment, the second non-phenolic color developer is a compound of the formula (1)

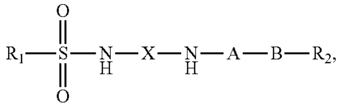

wherein $R_1$ is unsubstituted or substituted phenyl, naphthyl or $C_1$-$C_{20}$ alkyl, wherein X is a group of the formula

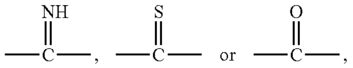

wherein A is unsubstituted or substituted phenylene, naphthylene or $C_1$-$C_{12}$ alkylene, or is an unsubstituted or substituted heterocyclic group, wherein B is a linking group of formula —O—$SO_2$—, —$SO_2$—O—, —NH—$SO_2$—, —$SO_2$—NH—, —S—$SO_2$—, —O—CO—, —O—CO—NH—, —NH—CO—, —NH—CO—O—, —S—CO—NH—, —S—CS—NH—, —CO—NH—$SO_2$—, —O—CO—NH—$SO_2$—, —NH═CH—, —CO—NH—CO—, —S—, —CO—, —O—, —$SO_2$—NH—CO—, —O—CO—O— and —O—PO—$(OR_2)_2$, and wherein $R_2$ is unsubstituted or substituted aryl or benzyl or $C_1$-$C_{20}$alkyl, with the proviso, that, if B is not a linking group of formula —O—$SO_2$—, $R_2$ is unsubstituted or substituted phenyl, naphthyl or $C_1$-$C_8$alkyl and that, if B is —O—, $R_2$ is not alkyl.

In exemplary embodiments, $R_1$ as phenyl or naphthyl can be unsubstituted or substituted by, for example, $C_1$-$C_8$ alkyl, $C_1$-$C_8$ alkoxy or halogen. Exemplary substituents are $C_1$-$C_4$ alkyl, especially methyl or ethyl, $C_1$-$C_4$alkoxy, especially methoxy or ethoxy, or halogen, especially chlorine. $R_1$ as naphthyl is unsubstituted in an exemplary embodiment. $R_1$ as phenyl is substituted in an exemplary embodiment, especially by one of the above alkyl substituents.

$R_1$ as $C_1$-$C_{20}$alkyl can be unsubstituted or substituted by, for example $C_1$-$C_8$alkoxy or halogen. Exemplary substituents are $C_1$-$C_4$ alkoxy, especially methoxy or ethoxy, or halogen, especially chlorine. $R_1$ as $C_1$-$C_{20}$alkyl is unsubstituted in an exemplary embodiment.

In exemplary embodiments, $R_1$ is phenyl which is unsubstituted or substituted by $C_1$-$C_8$ alkyl, $C_1$-$C_8$ alkoxy or halogen. Of most importance are the substituted phenyl groups. In exemplary embodiments, phenyl groups are substituted by $C_1$-$C_4$ alkyl, such as by methyl.

In an exemplary embodiment, X is a group of the formula

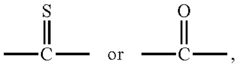

particularly a group of the formula

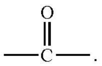

A as a phenylene or naphthylene group can be unsubstituted or substituted by, for example, $C_1$-$C_8$alkyl, halogen-substituted $C_1$-$C_8$alkyl, $C_1$-$C_8$alkoxy-substituted $C_1$-$C_8$alkyl, $C_1$-$C_8$alkoxy, halogen-substituted $C_1$-$C_8$alkoxy, $C_1$-$C_8$alkylsulphonyl, halogen, phenyl, phenoxy or phenoxycarbonyl. Preferred alkyl and alkoxy substituents are those containing 1 to 4 carbon atoms. Preferred substituents are $C_1$-$C_8$alkyl, halogen-substituted $C_1$-$C_8$alkyl, $C_1$-$C_8$alkyl-sulphonyl or halogen. A as a naphthylene group is preferably unsubstituted.

A as a heterocyclic group is preferably pyrimidylene which is unsubstituted or substituted by $C_1$-$C_8$alkyl, especially by $C_1$-$C_4$alkyl.

A as a $C_1$-$C_{12}$alkylene group is preferably $C_1$-$C_8$alkylene, especially $C_1$-$C_4$alkylene.

Preferred groups A are phenylene groups which are unsubstituted or substituted by $C_1$-$C_8$alkyl, halogen-substituted $C_1$-$C_8$alkyl, $C_1$-$C_8$alkoxy-substituted $C_1$-$C_8$alkyl, $C_1$-$C_8$alkoxy, halogen-substituted $C_1$-$C_8$alkoxy, $C_1$-$C_8$alkylsulphonyl, halogen, phenyl, phenoxy or phenoxycarbonyl, especially $C_1$-$C_8$alkyl, halogen-substituted $C_1$-$C_8$alkyl, $C_1$-$C_8$alkylsulphonyl or halogen.

Highly preferred groups A are phenylene groups which are unsubstituted or substituted by $C_1$-$C_4$alkyl or halogen, especially unsubstituted phenylene groups.

Preferred linking groups B are those of formulae —O—$SO_2$—, —$SO_2$—O—, —$SO_2$—NH—, —S—$SO_2$—, —O—, —O—CO— and —O—CO—NH—, especially linking groups of formulae —O—$SO_2$—, —$SO_2$—O— and —$SO_2$—NH. Highly preferred are the linking groups B of formula —O—$SO_2$— and —O—.

$R_2$ as aryl is preferably phenyl or naphthyl which can be unsubstituted or substituted by, for example, $C_1$-$C_8$alkyl, halogen-substituted $C_1$-$C_8$alkyl, $C_1$-$C_8$alkoxy-substituted $C_1$-$C_8$alkyl, $C_1$-$C_8$alkoxy, halogen-substituted $C_1$-$C_8$alkoxy or halogen. Preferred alkyl and alkoxy substituents are those containing 1 to 4 carbon atoms. Preferred substituents are $C_1$-$C_4$alkyl and halogen. $R_2$ as naphthyl is preferably unsubstituted.

$R_2$ as benzyl can be substituted by the substituents given for $R_2$ as phenyl or naphthyl. Unsubstituted benzyl is preferred.

$R_2$ as $C_1$-$C_2$alkyl is preferably $C_1$-$C_8$alkyl, especially $C_1$-$C_6$ alkyl, and can be unsubstituted or substituted by, for example, $C_1$-$C_8$alkoxy, halogen, phenyl or naphthyl. Preferred are the unsubstituted alkyl groups, especially $C_1$-$C_4$alkyl.

Preferred groups $R_2$ are $C_1$-$C_8$alkyl; halogen-substituted $C_1$-$C_8$alkyl; phenyl-substituted $C_1$-$C_8$alkyl; naphthyl-substituted $C_1$-$C_8$alkyl; phenyl which is unsubstituted or substituted by $C_1$-$C_8$alkyl, halogen-substituted $C_1$-$C_8$alkyl, $C_1$-$C_8$alkoxy-substituted $C_1$-$C_8$alkyl, $C_1$-$C_8$alkoxy, halogen-substituted $C_1$-$C_8$alkoxy or halogen; naphthyl and benzyl which is substituted by $C_1$-$C_4$alkyl or halogen.

Highly preferred groups $R_2$ are $C_1$-$C_4$alkyl; halogen-substituted $C_1$-$C_4$alkyl; phenyl which is unsubstituted or substituted by $C_1$-$C_4$alkyl or halogen; naphthyl and benzyl which is unsubstituted or substituted by $C_1$-$C_4$alkyl or halogen, especially phenyl which is unsubstituted or substituted by $C_1$-$C_4$alkyl.

Preferred are developers of formula (1), wherein $R_1$ is phenyl which is substituted by $C_1$-$C_4$alkyl, preferably by methyl, X is a group of the formula

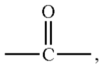
,

A is phenylene which is unsubstituted or substituted by $C_1$-$C_8$alkyl or halogen, preferably unsubstituted phenylene, like 1,3-phenylene, B is a linking group of formula —O—$SO_2$— or —O—, and $R_2$ is phenyl, naphthyl or benzyl which is unsubstituted or substituted by $C_1$-$C_4$alkyl or halogen, especially phenyl which is substituted by $C_1$-$C_4$alkyl.

In a particularly preferred embodiment, the thermosensitive coloring layer of the exemplary thermosensitive recording medium comprises a second color developer having the following formula:

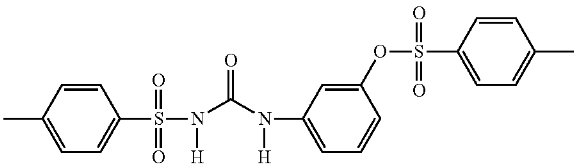

It is commercialized under the trade name PERGAFAST 201 by SOLENIS company.

Color Forming Compounds.

The color forming compounds are, for example, triphenylmethanes, lactones, benzoxazines, spiropyrans or preferably fluorans.

Exemplary color formers include but are not limited to; 3-diethylamino-6-methylfluoran, 3-dimethylamino-6-methyl-7-anilinofluoran, 3-diethylamino-6-methyl-7-anilinofluoran, 3-diethylamino-6-methyl-7-(2,4-dimethylanilino) fluoran, 3-diethylamino-6-methyl-7-chlorofluoran, 3-diethylamino-6-methyl-7-(3-trifluoromethylanilino) fluoran, 3-diethylamino-6-methyl-7-(2-chloroanilino)fluoran, 3-diethylamino-6-methyl-7-(4-chloroanilino) fluoran, 3-diethylamino-6-methyl-7-(2-fluoroanilino) fluoran, 3-diethylamino-6-methyl-7-(4-n-octylanilino) fluoran, 3-diethylamino-7-(4-n-octylanilino)fluoran, 3-diethylamino-7-(n-octylamino)fluoran, 3-diethylamino-7-(dibenzylamino) fluoran, 3-diethylamino-6-methyl-7-(dibenzylamino) fluoran, 3-diethylamino-6-chloro-7-methylfluoran, 3-diethylamino-7-t-butylfluoran, 3-diethylamino-7-carboxyethylfluoran, 3-diethylamino-6-chloro-7-anilinofluoran, 3-diethylamino-6-methyl-7-(3-methylanilino)fluoran, 3-diethylamino-6-methyl-7-(4-methylanilino)fluoran, 3-diethylamino-6-ethoxyethyl-7-anilinofluoran, 3-diethylamino-7-methylfluoran, 3-diethylamino-7-chlorofluoran, 3-diethylamino-7-(3-trifiuoromethylanilino)fluoran, 3-diethylamino-7-(2-chloroanilino)fluoran, 3-diethylamino-7-(2-fluoroanilino)fluoran, 3-diethylamino-benzo[a]fluoran, 3-diethylamino-benzo[c]fluoran, 3-dibutylamino-7-dibenzylaminofluoran, 3-dibutylamino-7-anilinofluoran, 3-diethyiamino-7-anilinofluoran, 3-dibutylamino-6-methylfluoran, 3-dibutylamino-6-methyl-7-anilinofluoran, 3-dibutylamino-6-methyl-7-(2,4-dimethylanilino)fluoran, 3-dibutytamino-6-methyl-7-(2-chloroanilino)fluoran, 3-dibutylamino-6-methyl-7-(4-chloroanilino)fluoran, 3-dibutylamino-6-methyl-7-(2-fluoroanitino)fluoran, 3-dibutylamino-6-methyl-7-(3-trifluoromethylanilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino)fluoran, 3-dibutylamino-7-(2-fluoroanilino) fluoran, 3-dibutylamino-7-(N-methyl-N-formylamino) fluoran, 3-dipentylamino-6-methyl-7-anilinofluoran, 3-dipentylamino-6-methyl-7-(4-2-chloroanilino)fluoran, 3-dipentylamino-7-(3-trifluoromethylanilino)fluoran, 3-dipentylamino-6-chloro-7-anilinofluoran, 3-dipentylamino-7-(4-chloroanilino)fluoran, 3-pyrrolidino-6-methyl-7-anilinofluoran, 3-piperidino-6-methyl-7-anilinofluoran, 3-(N-methyl-N-propylamino)-6-methyl-7-anilinoftuoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-p-toluidino)-6-methyl-7-anilinofluoran, 3-(N-ethyl-N-isoamylamino)-6-methyl-7-anilinofluoran, 3-(N-ethyl-N-isoamylamino)-6-chloro-7-anilinofluoran, 3-(N-ethyl-N-tetrahydrofurfurylamino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 3-cyclohexylamino-6-chlorofluoran, 2-methyl-6-p-(p-dimethytaminophenyl) aminoanilinofluoran, 2-methoxy-6-p-(p-dimethylaminophenyl)aminoanilinofluoran, 2-chloro-3-methyl-6-p-(p-phenylaminophenyl)aminoanilinofluoran, 2-diethylamino-6-p-(p-dimethylaminophenyl)aminoanilinofluoran, 2-phenyl-6-methyl-6-p-(p-phenylaminophenyl) aminoanilinofluoran, 2-benzyl-6-p-(p-phenylaminophenyl) aminoanilinofluoran, 3-methyl-6-p-(p-dimethylaminophenyl)aminoanilinofluoran, 3-diethylamino-6-p-(p-diethylaminophenyl)aminoanilino-fluoran, 3-diethyl-amino-6-p-(p-dibutylaminophenyl)aminoanilinofluoran, 2,4-dimethyl-6-[(4-dimethylamino)-anilino]fluoran, 3-[(4-dimethylaminophenyl)amino]-5,7-dimethylfluoran, 3,6,6'-tris(dimethyl-amino)spiro[fluorene-9,3'-phthalide], 3,6,6'-tris(diethylamino)spiro[fluorene-9,3'-phthalide], 3,3-bis(p-dimethylaminophenyl)-6-dimethylaminophthalide, 3,3-bis(p-dimethylamino-phenyl) phthalide, 3,3-bis-[2-(p-dimethyiaminophenyl)-2-(p-methoxyphenyl)ethenyl-4,5,6,7-tetrabromophthalide, 3,3-bis-[2-(p-dimethylaminophenyl)-2-(p-methoxyphenyl) ethenyl-4,5,6,7-tetrachlorophthalide, 3,3-bis[1,1-bis(4-pyrrolidinophenyl)ethylene-2-yl]-4,5,6,7-tetrabromophthalide, 3,3-bis-(1-(4-methoxyphenyl)-1-(4-pyrridinophenyl)ethylene-2-yl]-4,5,6,7-tetrachlorophthalide, 3-(4-diethylamino-2-ethoxyphenyl)-3-(1-ethyl-2-methylindole-3-yl)-4-azaphthalide, 3-(4-diethylamino-2-ethoxyphenyl)-3-(1-octyl-2-methylindole-3-yl)-4-azaphthalide, 3-(4-cyclohexylethylamino-2-methoxyphenyl)-3-(1-ethyl-2-methylindole-3-yl)-4-azaphthalide, 3,3-bis(1-ethyl-2-methylindole-3-yl) phthalide, 3,3-bis(1-octyl-2-methylindole-3-yl)phthalide, mixture of 2-phenyl-4-(4-diethylaminophenyl)-4-(4-methoxyphenyl)-6-methyl-7-dimethylamino-3,1-benzoxazine and 2-phenyl-4-(4-diethylaminophenyl)-4-(4-methoxyphenyl)-8-methyl-7-dimethylamino-3,1-benzoxazine, 4,4'-[1-methylethylidene)-bis(4,1-phenyleneoxy-4,2-quinazolinediyl)]bis[N,N-diethylbenzenamine], bis(N-methyldiphenylamine)-4-yl-(N-butylcarbazole)-3-yl-methane and mixtures thereof.

All of the above color forming compounds can be used singly or as a mixture with other color forming compounds; or they may also be used together with further black color forming compounds.

Exemplary color forming compounds are 3-diethylamino-6-methyl-7-anilinofluoran, 3-diethylamino-6-methyl-7-(3-methylanilino)fluoran, 3-diethylamino-6-methyl-7-(2,4-dimethylanilino)fluoran, 3-dibutylamino-6-methyl-7-anilinofluoran, 3-dipentylamino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-isoamylamino)-6-methyl-7-anilinofluoran, 3-diethylamino-6-chloro-7-anilinofluoran, 3-dibutylamino-7-(2-chloroanilino)fluoran, 3-N-ethyl-p-toluidino-6-methyl-7-anilinofluoran, 3-(N-ethyl-N-tetrahydrofurfurylamino)-6-methyl-7-anilinofluoran, 3-(N-ethyl-N-isobutylamino)-6-methyl-7-anilinofluoran, 3-N-ethyl-N-ethoxypropylamino-6-methyl-7-anilinofluoran, 2,4-dimethyl-6-[(4-dimethylamino)anilino]fluoran, 3-(4-diethylamino-2-ethoxyphenyl)-3-(1-octyl-2-methylindole-3yl)-4-azaphthalide, 3,3-bis(p-dimethylamino-phenyl)-6-dimethytaminophthalide and mixtures thereof.

It is also possible to use solid solutions comprising at least two color forming compounds.

A monophase (or single-phase or guest-host) solid solution possesses a crystal lattice which is identical with the crystal lattice of one of its components. One component is embedded as the 'guest' in the crystal lattice of the other component, which acts as the 'host'. The X-ray diffraction pattern of such a monophase solid solution is substantially identical to that of one of the components, called the 'host'. Within certain limits, different proportions of the components produce almost identical results.

In the literature, the definitions by the various authors, such as, G. H. Van't Hoff, A. I. Kitaigorodsky and A. Whitacker for solid solutions and mixed crystals are often contradictory, (cf, e.g. 'Analytical Chemistry of Synthetic Dyes', Chapter 10/page 269, Editor K. Venkataraman, J. Wiley, New York, 1977).

The term 'monophase solid solution' or 'multiphase solid solution' or 'mixed crystal', as defined herein, therefore, should be taken from the following definitions, which have been adapted to the current improved state of knowledge of such systems:

A monophase (or single-phase or guest-host) solid solution possesses a crystal lattice which is identical with the crystal lattice of one of its components. One component is embedded as the 'guest' in the crystal lattice of the other component, which acts as the 'host'. The X-ray diffraction pattern of such a monophase solid solution is substantially identical to that of one of the components, called the 'host'. Within certain limits, different proportions of the components produce almost identical results.

A multiphase solid solution possesses no precise, uniform crystal lattice. It differs from a physical mixture of its components in that the crystal lattice of at least one of its components is partially or completely altered. In comparison to a physical mixture of the components, which gives an X-ray diffraction diagram that is additive of the diagrams seen for the individual components. The signals in the X-ray diffraction diagram of a multiphase solid solution are broadened, shifted or altered in intensity. In general, different proportions of the components produce different results.

A mixed crystal (or solid compound type) solid solution possesses a precise composition and a uniform crystal lattice, which is different from the crystal lattices of all its components. If different proportions of the components lead, within certain limits, to the same result, then a solid solution is present in which the mixed crystal acts as a host.

For the avoidance of doubt, it may also be pointed out that, inter alia, there may also be amorphous structures and mixed aggregates consisting of different particles of different physical type, such as, for example, an aggregate of different components each in pure crystal modification. Such amorphous structures and mixed aggregates cannot be equated with either solid solutions or mixed crystals and possess different fundamental properties.

As hereinbefore detailed, the monophase solid solutions comprise a plurality of color compounds. Suitable color forming materials which may be included in the solid solutions are those given above.

Of particular interest are the following monophase solid solutions:

3-dibutylamino-6-methyl-7-anilinofluoran and 3-dibutylamino-7-dibenzylaminofluoran;
3-dibutylamino-6-methyl-7-anilinofluoran and 3-dibutylamino-7-anilinofluoran;
3-dibutylamino-6-methyl-7-anilinofluoran and 3-diethylamino-7-anilinofluoran;
3-diethylamino-6-methyl-7-anilinofluoran and 3-diethylamino-7-anilinofluoran;
3-dibutylamino-6-methyl-7-anilinofluoran and 3-diethylamino-6-methyl-7-anilinofluoran;
3-dibutylamino-6-methyl-7-anilinofluoran and 3-N-isoamyl-N-ethylamino-6-methyl-7-anilinofluoran;
3-dibutylamino-6-methyl-7-anilinofluoran and 3-N-2-pentyl-N-ethylamino-6-methyl-7-anilinofluoran;
3-dibutylamino-6-methyl-7-anilinofluoran and 3-N-isopropyl-N-ethylamino-6-methyl-7-anilinofluoran;
3-dibutylamino-6-methyl-7-anilinofluoran and 3-N-Cyclohexylmethyl-N-ethylamino-6-methyl-7-anilinofluoran;
3-dibutylamino-6-methyl-7-anilinofluoran and 3-dipropylamino-6-methyl-7-anilinofluoran;

3-dibutylamino-6-methyl-7-anilinofluoran and 3-N-2-butyl-N-ethylamino-6-methyl-7-anilinofluoran;

3-dibutylamino-6-methyl-7-anilinofluoran and 3-N-cyclohexyl-N-methylamino-6-methyl-7-anilinofluoran;

3-dibutylamino-6-methyl-7-anilinofluoran and 3-diethylamino-6-methyl-7-(3-methylanilino) fluoran;

3-dibutylamino-6-methyl-7-anilinofluoran and 3-diethylamino-6-methyl-7-(2,4-dimethylanilino)fluoran;

3-dibutylamino-6-methyl-7-anilinofluoran and 3-dipentylamino-6-methyl-7-anilinofluoran;

3-dibutylamino-6-methyl-7-anilinofluoran and 3-(N-methyl-N-propylamino)-6-methyl-7-anilinofluoran;

3-dibutylamino-6-methyl-7-anilinofluoran and 3-diethylamino-6-chloro-7-anilinofluoran;

3-dibutylamino-6-methyl-7-anilinofluoran and 3-dibutylamino-7-(2-chloroanilinofluoran;

3-dibutylamino-6-methyl-7-anilinofluoran and 3-N-ethyl-p-toluidino-6-methyl-7-anilinofluoran;

3-dibutylamino-6-methyl-7-anilinofluoran and 3-(N-ethyl-N-tetrahydrofurfurylamino)-6-methyl-7-anilinofluoran;

3-dibutylamino-6-methyl-7-anilinofluoran and 3-(N-ethyl-N-isobutylamino)-6-methyl-7-anilinofluoran;

3-dibutylamino-6-methyl-7-anifinofluoran and 3-N-ethyl-N-ethoxypropylamino-6-methyl-7-anilinofluoran;

3-dibutylamino-6-methyl-7-anilinofluoran and 2,4-dimethyl-6-[(4-dimethylamino)anilino]fluoran 3-N-isoamyl-N-ethylamino-6-methyl-7-anilinofluoran and 3-diethylamino-6-methyl-7-anilinofluoran;

3-diethylamino-6-methyl-7-anilinofluoran and 3-N-propyl-N-methylamino-6-methyl-7-anifinofluoran;

3-diethylamino-6-methyl-7-(3-tolyl)aminofluoran and 3-diethylamino-6-methyl-7-anilinofluoran;

3-dibutylamino-6-methyl-7-anilinofluoran and 3,3-bis(1-octyl-2-methylindol-3-yl)phthalide;

3-dibutylamino-6-methyl-7-anilinofluoran and mixture of 2-phenyl-4-(4-diethylaminophenyl)-4-(4-methoxyphenyl)-6-methyl-7-dimethylamino-3,1-benzoxazine and 2-phenyl-4-(4-diethylaminophenyl)-4-(4-methoxyphenyl)-8-methyl-7-dimethylamino-3,1-benzoxazine;

3-dibutylamino-6-methyl-7-anilinofluoran and 4,4'-[1-methylethylidene)bis(4,1-phenyleneoxy-4,2-quinazolinediyl)]bis[N,N-diethylbenzenamine].

In the above monophase solid solutions the first compound is in a molar ratio of 75 to 99.9% by mole, the second compound is in a ratio of 25 to 0.1% by mole.

Examples of monophase solid solutions comprising two components A and B in the stated ratios are: 3-dibutylamino-6-methyl-7-anilinofluoran (99.9%), 3-diethylamino-6-methyl-7-anilinofluoran (0.1%); 3-dibutylamino-6-methyl-7-anilinofluoran (99%), 3-diethylamino-6-methyl-7-anilinofluoran (1%); 3-dibutylamino-6-methyl-7-anilinofluoran (95%), 3-diethylamino-6-methyl-7-anilinofluoran (5%); 3-dibutylamino-6-methyl-7-anilinofluoran (90%) and 3-N-2-pentyl-N-ethylamino-6-methyl-7anilinofluoran (10%); 3-dibutylamino-6-methyl-7-anilinofluoran (95%) and 3-N-2-pentyl-N-ethylamino-6-methyl-7-anilinofluoran (5%); 3-dibutylamino-6-methyl-7-anilinofluoran (90%) and 3-N-isopropyl-N-ethylamino-6-methyl-7-anilinoftuoran (10%); 3-dibutylamino-6-methyl-7-anilinofluoran (95%) and 3-N-isopropyl-N-ethylamino-6-methyl-7-anilinofluoran (5%); 3-dibutylamino-6-methyl-7-anilinofluoran (90%) and 3-N-Cyclohexylmethyl-N-ethylamino-6-methyl-7-anilinofluoran (10%); 3-dibutylamino-6-methyl-7-anilinofluoran (95%) and 3-N-Cyclohexylmethyl-N-ethylamino-6-methyl-7-anilinofluoran (5%); 3-dibutylamino-6-methyl-7-anilinofluoran (90%) and 3-dipropylamino-6-methyl-7-anilinofluoran (10%); 3-dibutylamino-6-enethyl-7-anilinofluoran (95%) and 3-dipropylamino-6-methyl-7-anilinofluoran (5%); 3-dibutylamino-6-methyl-7-anilinofluoran (90%) and 3-N-2-butyl-N-ethylamino-6-methyl-7-anilinofluoran (10%); 3-dibutylamino-6-methyl-7-anilinofluoran (95%) and 3-N-2-butyl-N-ethylamino-6-methyl-7-anilinofluoran (5%); 3-dibutylamino-6-methyl-7-anilinofluoran (90%), 3-diethylamino-6-methyl-7-anilinofluoran (10%); 3-dibutylamino-6-methyl-7-anilinofluoran (85%), 3-diethyiamino-6-methyl-7-anilinofluoran (15%); 3-dibutylamino-6-methyl-7-anilinofluoran (80%), 3-diethylamino-6-methyl-7-anilinofluoran (20%); 3-dibutylamino-6-methyl-7-anifinofluoran (95%), 3-N-isoamyl-N-ethylamino-6-methyl-7-anilinofluoran (5%); 3-dibutylamino-6-methyl-7-anilinofluoran (90%), 3-N-isoamyl-N-ethylamino-6-methyl-7-anilinofluoran (10%); 3-dibutylamino-6-methyl-7-anilinofluoran (80%), 3-N-isoamyl-N-ethylamino-6-methyl-7-anilinofluoran (20%); 3-dibutylamino-6-methyl-7-anilinofluoran (90%), 3-N-cyclohexyl-N-methylamino-6-methyl-7-anilinofluoran (10%); 3-diethylamino-6-methyl-7-anilinofluoran (90%), 3-N-isoamyl-N-ethylamino-6-methyl-7-anilinofluoran (10%); 3-diethylamino-6-methyl-7-anilinofluoran (80%), 3-N-isoamyl-N-ethylamino-6-methyl-7-anilinofluoran (20%); 3-diethylamino-6-methyl-7-anilinofluoran (20%), 3-N-isoamyl-N-ethylamino-6-methyl-7-anifinofluoran (80%); 3-diethyiamino-6-methyl-7-anilinofluoran (10%), 3-N-isoamyl-N-ethylamino-6-methyl-7-anilinofluoran (90%); 3-diethyiamino-6-methyl-7-anilinofluoran (90%), 3-N-propyl-N-methylamino-6-methyl-7-anilinofluoran (10%); 3-diethylamino-6-methyl-7-anilinofluoran (80%), 3-N-propyl-N-methylamino-6-methyl-7-anilinofluoran (20%); 3-diethylamino-6-methyl-7-anilinofluoran (20%), 3-N-propyl-N-methylamino-6-methyl-7-anilinofluoran (80%); 3-diethylamino-6-methyl-7-anilinofluoran (10%), 3-N-propyl-N-methylamino-6-methyl-7-anilinofluoran (90%); 3-diethylamino-6-methyl-7-anilinofluoran (10%), 3-diethylamino-6-methyl-7-(3-tolyl) aminofluoran (90%); 3-diethylamino-6-methyl-7-anilinofluoran (20%), 3-diethylamino-6-methyl-7-(3-tolyl) aminofluoran (80%); 3-dibutylamino-6-methyl-7-anilinofluoran (90%), 3,3-bis(1-octyl-2-methylindol-3-yl) phthalide (10%); 3-diethyiamino-6-methyl-7-anilinofluoran (80%), 3,3-bis(1-octyl-2-methylindol-3-yl)phthalide (20%); 3-dibutylamino-6-methyl-7-anilinofluoran (90%), mixture of 2-phenyl-4-(4-diethylaminophenyl)-4-(4-methoxyphenyl)-6-methyl-7-dimethylamino-3,1-benzoxazine and 2-phenyl-4-(4-diethylaminophenyl)$_4$-(4-methoxyphenyl)-8-methyl-7-dimethylamino-3,1-benzoxazine (10%); 3-dibutylamino-6-methyl-7-anifinofluoran (80%), mixture of 2-phenyl-4-(4-diethylaminophenyl)-4-(4-methoxyphenyl)-6-methyl-7-dimethylamino-3,1-benzoxazine and 2-phenyl-4-(4-diethylaminophenyl)-4-(4-methoxyphenyl)-8-methyl-7dimethylamino-3,1-benzoxazine (20%); 3-dibutylamino-6-methyl-7-anilinofluoran (90%), 4,4'-[1-methylethylidene) bis(4,1-phenyleneoxy-4,2-quinazolinediyl)bis(N,N-diethylbenzenamine](10%); 3-dibutylamino-6-methyl-7-anilinofluoran (80%), 4,4'-[1-methylethylidene)bis(4,1-phenyleneoxy-4,2-quinazolinediyl)]bis[N,N-diethylbenzenamine] (20%).

The monophase solid solutions can be used singly or as a mixture with other color forming compounds such as triphenylmethanes, lactones, fluorans, benzoxazines and spiropyrans; or they may also be used together with further black color forming compounds. Examples of such other color forming compounds are given hereinbefore.

The monophase solid solutions can be prepared by a variety of methods. One such method is the recrystallisation method wherein a physical mixture of the desired components is dissolved, with or without heating, in a suitable solvent or solvent mixture. Suitable solvents include but are not limited to toluene, benzene, xylene, dichlorobenzene, chlorobenzene, 1,2-dichloroethane, methanol, ethanol, isopropanol, n-butanol, acetonitrile, dimethylformamide or mixtures of these solvents with each other and with water. The monophase solid solution is then isolated by crystallisation from the solvent or solvent mixture. This can be brought about by cooling, standing, addition of a further solvent to promote crystallisation or concentration by standard means such as distillation, steam distillation and vacuum distillation. When the monophase solid solution is isolated by concentration it may be advantageous to do so in the presence of a small amount of base, to improve the visual aspect of the isolated product.

Alternatively, monophase solid solutions can be prepared from mixtures of the appropriate starting materials. The technique can be used to produce mixtures of two or more fluorans or phthalides. For example, mixtures of two fluorans are produced by replacing a single starting material with two analogous materials to the same total molar concentration in the reaction. In the case of fluorans, these starting materials are derivatives of amino phenols, phthalic anhydrides, keto acids and diphenylamines.

In addition, the heat sensitive recording material can contain a previously known developer, unless the color forming performance of the resultant heat sensitive material is disturbed thereby. Such developers are exemplified by but not limited to; 4,4'-isopropylidene bisphenol, 4,4'-sec-butylidene bisphenol, 4,4'-cyclohexylidene bisphenol, 2,2-bis-(4-hydroxyphenyl)-4-methylpentane, 2,2-dimethyl-3,3-di(4-hydroxyphenyl)butane, 2,2'-dihydroxydiphenyl, 1-phenyl-1,1-bis(4-hydroxyphenyl)butane, 4-phenyl-2,2-bis(4-hydroxyphenyl)butane, 1-phenyl-2,2-bis(4-hydroxyphenyl) butane, 2,2-bis(4'-hydroxy-3'-methylphenyl)-4-methylpentane, 2,2-bis(4'-hydroxy-3'-tert-butyllphenyl)-4-methylpentane, 4,4'-sec-butylidene-bis (2-methylphenol), 4,4'-isopropylidene-bis (2-tert-butylphenol), 2,2-bis(4'-hydroxy-3'-isopropylphenyl)-4-methylpentane, allyl-4,4-bis (4'-hydroxyphenyl) pentanoate, propargyl-4,4-bis(4'-hydroxyphenyl)pentanoate, n-propyl-4,4-bis (4'-hydroxyphenyl)pentanoate, 2,4-bis (phenylsulfonyl)phenol, 2-(4-methylsulfonyl)-4-(phenylsulfonyl)phenol, 2-(phenylsulfonyl)-4-(4-methylsulfonyl)phenol, 2,4-bis (4-methylphenylsulfonyl)phenol, pentamethylene-bis(4-hydroxybenzoate), 2,2-dimethyl-3,3-di(4-hydroxyphenyl)pentane, 2,2-di(4-hydroxyphenyl)hexane, 4,4'-dihydroxydiphenyl thioether, 1,7-di(4-hydroxyphenylthio)-3,5-dioxaheptane, 2,2'-bis(4-hydroxyphenylthio)diethyl ether, 4,4'-dihydroxy-3,3'-dimethylphenyl thioether; benzyl-4-hydroxybenzoate, ethyl-4-hydroxybenzoate, propyl-4-hydroxybenzoate, isopropyl-4-hydroxybenzoate, butyl-4-hydroxybenzoate, isobutyl-4-hydroxybenzoate, 4,4'-dihydroxydiphenylsulfone, 2,4'-dihydroxydiphenyl sulfone, 4-hydroxy-4'-methyldiphenyl sulfone, 4-hydroxy-4'-isopropoxydiphenyl sulfone, 4-hydroxy-4'-butoxydiphenyl sulfone, 4,4'-dihydroxy-3,3'-diallyldiphenyl sulfone, 3,4-dihydroxy-4'-methyldiphenyl sulfone, 4,4'-dihydroxy-3,3',5,5'-tetrabromodiphenyl sulfone, 4,4'-bis (p-toluenesulphonylaminocarbonylamino) diphenylmethane, N-p-toluenesulphonyl-N'-phenyl urea, dimethyl 4-hydroxyphthalate, dicyclohexyl 4-hydroxyphthalate, diphenyl 4-hydroxyphthalate, 4-[2-(4-methoxyphenyloxy) ethyloxy] salicylate, 3,5-di-tert-butylsalicylic acid, 3-benzyl salicylic acid, 3-(α-methylbenzyl) salicylic acid, 3-phenyl-5-(α,α-dimethylbenzyl) salicylic acid, 3,5-di-α-methylbenzyl salicylic acid; metal salts of salicylic acid, 2-benzylsulfonylbenzoic acid, 3-cyclohexyl-4-hydroxybenzoic acid, zinc benzoate, zinc 4-nitrobenzoate, 4-(4'-phenoxybutoxy) phthalic acid, 4-(2'-phenoxyethoxy)phthalic acid, 4-(3'-phenylpropyloxyyphthalic acid, mono (2-hydroxyethyl)-5-nitro-isophthalic acid, 5-benzyloxycarbonyl isophthalic acid, 5-(1'-phenylethanesulfonyl)isophthalic acid, bis(1,2-dihydro-1,5-dimethyl-2-phenyl-3H-pyrazol-3-one-O)bis(thiocyanato-N)zinc and mixtures thereof.

In addition, the exemplary heat sensitive recording material can contain a sensitiser. Representative examples of sensitiser are stearamide, methylol stearamide, p-benzylbiphenyl, m-terphenyl, 2-benzyloxynaphthalene, 4-methoxybiphenyl, dibenzyl oxalate, di(4-methylbenzyl) oxalate, di(4-chlorobenzyl)oxalate, dimethyl phthalate, dibenzyl terephthalate, dibenzyl isophthalate, 1,2-diphenoxyethane, 1,2-bis(4-methylphenoxy)ethane, 1,2-bis(3-methylphenoxy)ethane, 4,4'-dimethylbiphenyl, phenyl-1-hydroxy-2-naphthoate, 4-methylphenyl biphenyl ether, 1,2-bis(3,4-dimethylphenyl)ethane, 2,3,5,6-4'-methyldiphenyl methane, 1,4-diethoxynaphthalene, 1,4-diacetoxybenzene, 1,4-diproprionoxybenzene, o-xylylene-bis(phenyl ether), 4-(m-methylphenoxymethyl) biphenyl, p-hydroxyacetanilide, p-hydroxybutyranilide, p-hydroxynonananilide, p-hydroxylauranilide, p-hydroxyoctadecan-anilide, N-phenyl-phenylsulphonamide and sensitisers of the formula

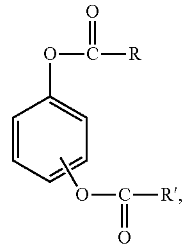

(3)

wherein R and R' are identical or different from each other and each represent $C_1$-$C_6$ alkyl.

Examples of R and R' are methyl, ethyl, n- or iso-propyl and n-, sec- or tert-butyl.

The substituents R and R' are identical or different from each other and each are preferably $C_1$-$C_4$alkyl, especially methyl or ethyl, in particular ethyl.

The above sensitisers are known or can be prepared according to known methods.

In addition, the exemplary heat sensitive recording material can contain a stabiliser. Representative stabilisers for use in heat sensitive recording materials include 2,2'-methylene-bis(4-methyl-6-tert-butylphenol), 2,2'-methylene-bis(4-ethyl-6-tert-butylphenol), 4,4'-butylidene-bis(3-methyl-6-tert-butylphenol), 4,4'-thio-bis(2-tert-butyl-5-methylphenol), 1,1,3-tris(2-methyl-4-hydroxy-5-tert-butylphenyl) butane, 1,1,3-tris(2-methyl-4-hydroxy-5-cyclohexylphenyl)butane, bis(3-tert-butyl-4-hydroxy-6-methylphenyl)sulfone, bis(3,5-dibromo-4-hydroxyphenyl) sulfone, 4,4'-sulfinyl bis (2-tert-butyl-5-methylphenol), 2,2'-methylene bis (4,6-di-tert-butylphenyl)phosphate and alkali metal, ammonium and polyvalent metal salts thereof, 4-benzyloxy-4'-(2-methylglycidyloxy)diphenyl sulfone, 4,4'-diglycidyloxydiphenyl sulfone, 1,4-diglycidyloxybenzene, 4-[a-(hydroxymethyl)benzyloxy]4-hydroxydiphenyl sulfone, metal salts of p-nitrobenzoic acid, metal salts of phthalic acid mono benzyl ester, metal salts of cinnamic acid and mixtures thereof.

Preferred stabilisers are 4,4'-butylidene-bis(3-methyl-6-tert-butylphenol), 4,4'-thio-bis(2-tert-butyl-5-methylphenol), 1,1,3-tris(2-methyl-4-hydroxy-5-tert-butylphenyl)butane, 1,1,3-tris(2-methyl-4-hydroxy-5-cyclohexylphenyl) butane, 4-benzyloxy-4'-(2-methylglycidyloxy)diphenyl sulfone and mixtures thereof.

The exemplary heat sensitive recording material can be prepared according to conventional methods. For example, at least one color forming compound, at least one developer and, if desired, at least one sensitiser are pulverised separately in water or a suitable dispersing medium, such as aqueous polyvinyl alcohol, to form an aqueous or other dispersion. If desired a stabiliser is treated in the same manner. The fine particle dispersions thus obtained are combined and then mixed with conventional amounts of binder, filler and lubricant.

Representative binders used for the heat sensitive recording material include polyvinyl alcohol (fully and partially hydrolysed), carboxy, amide, sulfonic and butyral modified polyvinyl alcohols, derivatives of cellulose such as hydroxyethyl cellulose, methyl cellulose, ethyl cellulose, carboxymethyl cellulose and acetyl cellulose, copolymer of styrene-maleic anhydride, copolymer of styrene-butadiene, polyvinyl chloride, polyvinyl acetate, polyacrylamide, polyamide resin and mixtures thereof.

Exemplary fillers which can be used include calcium carbonate, kaolin, calcined kaolin, aluminium hydroxide, talc, titanium dioxide, zinc oxide, silica, polystyrene resin, urea-formaldehyde resin, hollow plastic pigment and mixtures thereof.

Representative lubricants for use in heat sensitive recording materials include dispersions or emulsions of stearamide, methylene bisstearamide, polyethylene, carnauba wax, paraffin wax, zinc stearate or calcium stearate and mixtures thereof.

Other additives can also be employed, if necessary. Such additives are for example fluorescent whitening agents and ultraviolet absorbers.

The coating composition so obtained can be applied to a suitable substrate such as paper, plastic sheet and resin coated paper, and used as the heat sensitive recording material. Embodiments herein can be employed for other end use applications using color forming materials, for example, a temperature indicating material.

The quantity of the coating is usually in the range of 2 to 10 $g/m^2$, most often in the range 4 to 8 $g/m^2$.

The recording material containing such a thermosensitive coloring layer can in addition contain a protective layer and, if desired, an undercoat layer. The undercoat layer may be interposed between the substrate and the thermosensitive coloring layer.

The protective layer usually comprises a water-soluble resin in order to protect the thermosensitive coloring layer. If desired, the protective layer may contain water-soluble resins in combination with water-insoluble resins.

As such resins conventional resins can be employed. Specific examples are: polyvinyl alcohol; starch and starch derivatives; cellulose derivatives such as methoxycellulose, hydroxyethylcellulose, carboxymethylcellulose, methylcellulose and ethylcellulose; sodium polyacrylate; polyvinyl pyrrolidone; polyacrylamide/acrylic acid ester copolymers; acrylamide/acrylic acid ester/methacrylic acid copolymers; alkali metal salts of styrene/maleic anhydride copolymers; alkali metal salts of isobutylene/maleic anhydride copolymers; polyacrylamide; sodium alginate; gelatin; casein; water-soluble polyesters and carboxyl-group-modified polyvinyl alcohols.

The protective layer may also contain a water-resisting agent such as a polyamide resin, melamine resin, formaldehyde, glyoxal or chromium alum.

Furthermore, the protective layer may contain fillers, such as finely-divided inorganic powders, e.g. of calcium carbonate, silica, zinc oxide, titanium oxide, aluminium hydroxide, zinc hydroxide, barium sulphate, clay, talc, surface-treated calcium or silica, or a finely-divided organic powder of, e.g., a urea-formaldehyde resin, a styrene/methacrylic acid copolymer or polystyrene.

The undercoat layer usually contains as its main components a binder resin and a filler.

Specific examples of binder resins for use in the undercoat layer are: polyvinyl alcohol; starch and starch derivatives; cellulose derivatives such as methoxycellulose, hydroxyethylcellulose, carboxymethylcellulose, methylcellulose and ethylcellulose; sodium polyacrylate; polyvinyl pyrrolidone; polyacrylamide/acrylic acid ester copolymers; acrylamide/acrylic acid ester/methacrylic acid copolymers; alkali metal salts of styrene/maleic anhydride copolymers; alkali metal salts of isobutylene/maleic anhydride copolymers; polyacrylamide; sodium alginate; gelatin; casein; water-soluble polymers such as water-soluble polyesters and carboxyl-group-modified polyvinyl alcohols; polyvinyl acetate; polyurethanes; styrene/butadiene copolymers; polyacrylic acid; polyacrylic acid esters; vinyl chloride/vinyl acetate copolymers; polybutylmethacrylate; ethylene/vinylacetate copolymers and styrene/butadiene acrylic derivative copolymers.

Specific examples of fillers for use in the undercoat layer are: finely-divided inorganic powders, e.g. of calcium carbonate, silica, zinc oxide, titanium oxide, aluminium hydroxide, zinc hydroxide, barium sulphate, clay, talc, surface-treated calcium, silica or calcined clay (e.g. Ansilex, Engelhard Corp.), and finely-divided organic powders of, e.g., urea-formaldehyde resins, styrene/methacrylic acid copolymers and polystyrene.

In addition, the undercoat layer may contain a water-resisting agent. Examples of such agents are given above.

In particular, embodiments herein provide exceptional resistance to plasticiser, oil and heat ageing whilst showing an improved background whiteness.

Furthermore, examples of suitable second non-phenolic color developer compounds are shown in U.S. Pat. No. 6,624,117 B1, issued on Sep. 23, 2003 and incorporated herein in its entirety.

Heat Sensitive Recording Material

A heat sensitive recording material of embodiments herein can be used for any purpose as long as it is a recording material containing a color former, a first non-phenol color developer and a second non-phenol color developer as described herein, and for example, can be used as a thermal recording material or a pressure-sensitive copying material.

In a recording material, the proportion of the compound(s) of the non-phenol color developers to the color former used may be from 0.01 to 10 parts by mass, such as from 0.5 to 10 parts by mass, for example from 1.0 to 5 parts by mass, with respect to 1 part by mass of the color former.

Other Components in Recording Material

In exemplary embodiments, the recording material can contain, in addition to the color former and the non-phenol color developers, one or more of color-developing agents, image stabilizers, sensitizers, fillers, dispersants, antioxidants, desensitizers, anti-tack agents, antifoaming agents, light stabilizers, fluorescent brightening agents, etc., known in the art, as needed. The amount of each of the components used may be in the range of from about 0.1 to about 15 parts by mass, such as from 1 to 10 parts by mass, with respect to 1 part by mass of the color former.

These agents may be contained in a color-developing layer or may be contained in any layer, for example, a protective layer, when they consist of a multilayer structure. Particularly, when an overcoat layer or an undercoat layer is provided in the upper and/or lower parts of the color-developing layer, these layers can contain antioxidants, light stabilizers, etc. Furthermore, these antioxidants or light stabilizers can be contained in a form encapsulated in microcapsules, as needed, in these layers.

Color Former

Examples of the color former used in the recording material described herein can include, but not limited to, fluoran, phthalide, lactam, triphenylmethane, phenothiazine, and spiropyran leuco dyes. Any color former that forms a color by contact with the color-developing agent, which is an acidic substance, can be used. Moreover, these color formers can be used alone to produce a recording material with the color to be formed, as a matter of course. Alternatively, two or more thereof can be mixed for use. For example, three primary color (red, blue, and green) formers or black color formers can be mixed and used to produce a recording material that develops a true black color.

Examples of the fluoran color formers include 3,3-bis(p-dimethylaminophenyl)-phthalide, 3,3-bis(p-dimethylaminophenyl)-6-dimethylaminophthalide (also known as crystal violet lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)-phthalide, 3-cyclohexylamino-6-chlorofluoran, 3-dimethylamino-5,7-dimethylfluoran, 3-N-methyl-N-isopropylamino-6-methyl-7-anilinofluoran, 3-N-methyl-N-isobutylamino-6-methyl-7-anilinofluoran, 3-N-methyl-N-isoamylamino-6-methyl-7-anilinofluoran, 3-diethylamino-7-chlorofluoran, 3-diethylamino-6,8-dimethylfluoran, 3-diethylamino-7-methylfluoran, 3-diethylamino-7,8-benzofluoran, 3-diethylamino-6-methyl-7-chlorofluoran, 3-dibutylamino-6-methyl-7-bromofluoran, 3-(N-p-tolyl-N-ethylamino)-6-methyl-7-anilinofluoran, 3-pyrrolidino-6-methylamino-7-anilinofluoran, 2-{N-(3'-trifluoromethylphenyl)amino}-6-diethylaminofluoran, 2-{3,6-bis(diethylamino)-9-(o-chloroanilino)xanthylbenzoic acid lactam}, 3-diethylamino-6-methyl-7-(m-trichloromethylanilino)fluoran, 3-diethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyclohexylamino-6-methyl-7-anilinofluoran, 3-diethylamino-6-methyl-7-anilinofluoran, 3-diethylamino-6-methyl-7-(2',4'-dimethylanilino)fluoran, 3-(N,N-diethylamino)-5-methyl-7-(N,N-dibenzylamino)fluoran, 3-(N,N-diethylamino)-7-(N,N-dibenzylamino)fluoran, 3-(N-ethyl-N-isobutylamino)-6-methyl-7-anilinofluoran, 3-(N-ethyl-N-propylamino)-6-methyl-7-anilinofluoran, 3-(N-methyl-N-propylamino)-6-methyl-7-anilinofluoran, 3-(N-ethyl-N-isopentylamino)-6-methyl-7-anilinofluoran, 3-(N-ethyl-N-toluidino)-6-methyl-7-anilinofluoran, 3-pyrrolidino-6-methyl-7-anilinofluoran, 3-piperidino-6-methyl-7-anilinofluoran, 3-dimethylamino-7-(m-trifluoromethylanilino)fluoran, 3-dipentylamino-6-methyl-7-anilinofluoran, 3-(N-ethoxypropyl-N-ethylamino)-6-methyl-7-anilinofluoran, 3-dibutylamino-7-(o-fluoroanilino)fluoran, 3-diethylaminobenzo[a]fluoran, 3-diethylamino-5-methyl-7-benzylaminofluoran, 3-diethylamino-5-chlorofluoran, 3-diethylamino-6-(N,N'-dibenzylamino)fluoran, 3,6-dimethoxyfluoran, 2,4-dimethyl-6-(4-dimethylaminophenyl)aminofluoran, 3-diethylamino-7-(m-trifluoromethylanilino)fluoran, 3-diethylamino-6-methyl-7-octylaminofluoran, 3-diethylamino-6-methyl-7-(m-tolylamino)fluoran, 3-diethylamino-6-methyl-7-(2,4-xylylamino)fluoran, 3-diethylamino-7-(o-fluoroanilino) fluoran, 3-diphenylamino-6-methyl-7-anilinofluoran, benzoylleucomethylene blue, 6'-chloro-8'-methoxy-benzindolino-spiropyran, 6'-bromo-3'-methoxy-benzindolino-spiropyran, 3-(2'-hydroxy-4'-dimethylaminophenyl)-3-(2'-methoxy-5'-chlorophenyl)phthalide, 3-(2'-hydroxy-4'-dimethylaminophenyl)-3-(2'-methoxy-5'-nitrophenyl) phthalide, 3-(2'-hydroxy-4'-diethylaminophenyl)-3-(2'-methoxy-5'-methylphenyl)phthalide, 3-(2'-methoxy-4'-dimethylaminophenyl)-3-(2'-hydroxy-4'-chloro-5'-methylphenyl)phthalide, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5-chloro-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyl-toluidino)-7-(p-n-butylanilino)fluoran, 3-(N-methyl-N-isopropylamino)-6-methyl-7-anilinofluoran, 3-dibutylamino-6-methyl-7-anilinofluoran, 3-dipentylamino-6-methyl-7-anilinofluoran, 3,6-bis(dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-N-ethyl-N-(2-ethoxypropyl)amino-6-methyl-7-anilino-fluoran, 3-N-ethyl-N-tetrahydrofurfurylamino-6-methyl-7-anilinofluoran, 3-diethylamino-6-methyl-7-mesidino-4',5'-benzofluoran, and 3-(N-ethyl-p-toluidino)-7-(methylphenylamino)fluoran.

Among these color formers, exemplary examples thereof can include 3,3-bis(p-dimethylaminophenyl)-6-dimethylaminophthalide, 3-cyclohexylamino-6-chlorofluoran, 3-diethylamino-7-chlorofluoran, 3-diethylamino-6,8-dimethylfluoran, 3-diethylamino-7-methylfluoran, 3-diethylamino-7,8-benzofluoran, 3-diethylamino-6-methyl-7-chlorofluoran, 3-dibutylamino-6-methyl-7-bromofluoran, 3-diethylamino-7-(o-chloroanilino)fluoran, 3-dibutylamino-7-(o-chloroanilino)fluoran, 3-N-methyl-N-cyclohexylamino-6-methyl-7-anilinofluoran, 3-(N,N-diethylamino)-5-methyl-7-(N,N-dibenzylamino)fluoran, 3-(N,N-diethylamino)-7-(N,N-dibenzylamino)fluoran, 3-(N-ethyl-N-isobutylamino)-6-methyl-7-anilinofluoran, 3-(N-methyl-N-propylamino)-6-methyl-7-anilinofluoran, 3-(N-ethyl-N-isopentylamino)-6-methyl-7-anilinofluoran, 3-(N-ethyl-N-toluidino)-6-methyl-7-anilinofluoran, 3-(N-ethoxypropyl-N-ethylamino)-6-methyl-7-anilinofluoran, 3-dibutylamino-7-(o-fluoroanilino)fluoran, 3-diethylamino-7-(m-trifluoromethylanilino)fluoran, 3-diethylamino-6-methyl-7-octylaminofluoran, 3-diethylamino-6-methyl-7-(m-tolylamino)fluoran, 3-diethylamino-7-(o-fluoroanilino) fluoran, 3-diphenylamino-6-methyl-7-anilinofluoran, benzoylleucomethylene blue, 3-dibutylamino-6-methyl-7-anilinofluoran, 3-N-ethyl-N-tetrahydrofurfurylamino-6-methyl-7-anilinofluoran, and 3-(N-ethyl-p-toluidino)-7-(methylphenylamino)fluoran.

Dyes

Moreover, examples of near infrared absorbing dyes include 3-[4-[4-(4-anilino)-anilino]anilino]-6-methyl-7-chlorofluoran, 3,3-bis[2-(4-dimethylaminophenyl)-2-(4-methoxyphenyl)vinyl]-4,5,6,7-tetrachlorophthalide, and 3,6,6'-tris(dimethylamino)spiro(fluorene-9,3'-phthalide).

Exemplary non-phenol color developers described herein are suitably used, as a color-developing agent mainly in a thermal recording material, and these compounds alone can be used or these compounds can be used together with a plurality of known color-developing agents. In certain embodiments, the ratio among them is arbitrary.

Other Color Developers

Examples of other color-developing agents can specifically include the followings: bisphenol compounds such as bisphenol A, 4,4'-sec-butylidenebisphenol, 4,4'-cyclohexylidenebisphenol, 2,2'-bis(4-hydroxyphenyl)-3,3'-dimethylbutane, 2,2'-dihydroxydiphenyl, pentamethylene-bis(4-hydroxybenzoate), 2,2-dimethyl-3,3-di(4-hydroxyphenyl) pentane, 2,2-di(4-hydroxyphenyl)hexane, 2,2-bis(4-hydroxyphenyl)propane, 2,2-bis(4-hydroxyphenyl)butane, 2,2-bis(4-hydroxy-3-methylphenyl)propane, 4,4'-(1-phenylethylidene)bisphenol, 4,4'-ethylidenebisphenol(hydroxyphenyl)methylphenol, 2,2'-bis(4-hydroxy-3-phenyl-phenyl) propane, 4,4'-(1,3-phenylenediisopropylidene)bisphenol, 4,4'-(1,4-phenylenediisopropylidene)bisphenol, and butyl 2,2-bis(4-hydroxyphenyl)acetate; sulfur-containing bisphenol compounds such as 4,4'-dihydroxydiphenyl thioether, 1,7-di(4-hydroxyphenylthio)-3,5-dioxaheptane, 2,2'-bis(4-hydroxyphenylthio)diethyl ether, and 4,4'-dihydroxy-3,3'-dimethyldiphenyl thioether; 4-hydroxybenzoic acid esters such as benzyl 4-hydroxybenzoate, ethyl 4-hydroxybenzoate, propyl 4-hydroxybenzoate, isopropyl 4-hydroxybenzoate, butyl 4-hydroxybenzoate, isobutyl 4-hydroxybenzoate, chlorobenzyl 4-hydroxybenzoate, methylbenzyl 4-hydroxybenzoate, and diphenylmethyl 4-hydroxybenzoate; metal salts of benzoic acid such as zinc benzoate and zinc 4-nitrobenzoate, salicylic acids such as 4-[2-(4-methoxyphenyloxy)ethyloxy]salicylic acid; metal salts of salicylic acid such as zinc salicylate and zinc bis[4-(octyloxycarbonylamino)-2-hydroxybenzoate]; hydroxysulfones such as 4,4'-dihydroxydiphenylsulfone, 2,4'-dihydroxydiphenylsulfone, 4-hydroxy-4'-methyldiphenylsulfone, 4-hydroxy-4'-isopropoxydiphenylsulfone, 4-hydroxy-4'-butoxydiphenylsulfone, 4,4'-dihydroxy-3,3'-diallyldiphenylsulfone, 3,4-dihydroxy-4'-methyldiphenylsulfone, 4,4'-dihydroxy-3,3',5,5'-tetrabromodiphenylsulfone, 4-allyloxy-4'-hydroxydiphenylsulfone, 2-(4-hydroxyphenylsulfonyl) phenol, 4,4'-sulfonylbis[2-(2-propenyl)]phenol, 4-[[4-(propoxy)phenyl}sulfonyl]phenol, 4-[{4-(allyloxy) phenyl}sulfonyl]phenol, 4-[{4-(benzyloxy) phenyl}sulfonyl]phenol, and 2,4-bis(phenylsulfonyl)-5-methyl-phenol; 2,4'-dihydroxydiphenyl sulfone (BPS 2,4'), bis-(4hydroxyphenyl)sulfone (BPS 4,4'), Bis(3-allyl-4-hydroxyphenyl)sulfone (TG-SA), B-TUM, SZ110, polyvalent metal salts of hydroxysulfones such as 4-phenylsulfonylphenoxy-zinc magnesium, -aluminum, and -titanium; 4-hydroxyphthalic acid diesters such as dimethyl 4-hydroxyphthalate, dicyclohexyl 4-hydroxyphthalate, and diphenyl 4-hydroxyphthalate; hydroxynaphthoic acid esters such as 2-hydroxy-6-carboxynaphthalene; trihalomethylsulfones such as tribromomethylphenylsulfone; sulfonylureas such as 4,4'-bis(p-toluenesulfonylaminocarbonylamino)diphenylmethane and N-(4-methylphenylsulfonyl)-N'-(3-(4-methylphenylsulfonyloxy)phenyl)urea; hydroxyacetophenone, p-phenylphenol, benzyl 4-hydroxyphenylacetate, p-benzylphenol, hydroquinone-monobenzyl ether, 2,4-dihydroxy-2'-methoxybenzanilide, tetracyanoquinodimethanes, N-(2-hydroxyphenyl)-2-[(4-hydroxyphenyl)thio]acetamide, N-(4-hydroxyphenyl)-2-[(4-hydroxyphenyl)thio]acetamide, 4-hydroxybenzenesulfonanilide, 4'-hydroxy-4-methylbenzenesulfonanilide, 4,4'-bis(4-methyl-3-phenoxycarbonyl) aminophenylureido))diphenylsulfone, 3-(3-phenylureido) benzenesulfonanilide, octadecylphosphoric acid, and dodecylphosphoric acid; and cross-linked diphenylsulfone compounds represented by the following formula or mixtures thereof:

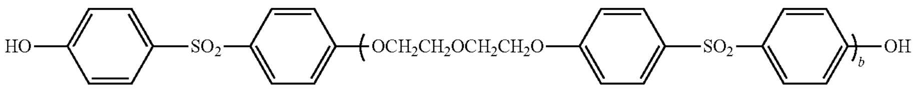

(b represents an integer of 0 to 6)

Among them, preferable examples thereof include 4-hydroxy-4'-isopropoxydiphenylsulfone and cross-linked diphenylsulfone compounds or mixtures thereof.

Stabilizer

Examples of the image stabilizer can include: epoxy group-containing diphenylsulfones such as 4-benzyloxy-4'-(2-methylglycidyloxy)-diphenylsulfone and 4,4'-diglycidyloxydiphenylsulfone; 1,4-diglycidyloxybenzene, 4-[α-(hydroxymethyl)benzyloxy]-4'-hydroxydiphenylsulfone, 2-propanol derivatives, salicylic acid derivatives, metal salts (particularly, zinc salts) of oxynaphthoic acid derivatives, metal salts of 2,2-methylenebis(4,6-t-butylphenyl)phosphate, and other water-insoluble zinc compounds; hindered phenol compounds such as 2,2-bis(4'-hydroxy-3',5'-dibromophenyl)propane, 4,4'-sulfonylbis(2,6-dibromophenol), 4,4'-butylidene(6-t-butyl-3-methylphenol), 2,2'-methylene-bis(4-methyl-6-t-butylphenol), 2,2'-methylene-bis(4-ethyl-6-t-butylphenol), 2,2'-di-t-butyl-5,5'-dimethyl-4,4'-sulfonyldiphenol, 1,1,3-tris(2-methyl-4-hydroxy-5-cyclohexylphenyl)butane, and 1,1,3-tris(2-methyl-4-hydroxy-5-t-butylphenyl)butane, and phenol novolac compounds, epoxy resins, and UU (color-developing agent manufactured by CHEMIPRO KASEI).

The examples further include a cross-linked diphenylsulfone compound represented by the following formula or a mixture thereof:

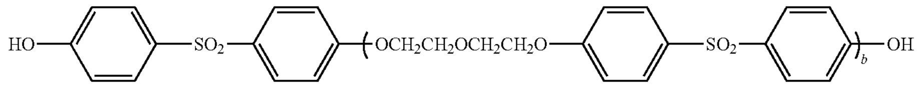

(b represents an integer of 0 to 6)

An exemplary image stabilizer is a compound that is solid at room temperature, such as a compound with a melting point of 60° C. or higher and is poorly soluble in water.

Sensitizer

Examples of the sensitizer can include: higher fatty acid amides such as stearic acid amide, stearic acid anilide, and palmitic acid amide; amides such as benzamide, acetoacetic acid anilide, thioacetanilide acrylic acid amide, ethylenebisamide, ortho-toluenesulfonamide, and para-toluenesulfonamide; phthalic acid diesters such as dimethyl phthalate, dibenzyl isophthalate, dimethyl isophthalate, dimethyl terephthalate, diethyl isophthalate, diphenyl isophthalate, and dibenzyl terephthalate; oxalic acid diesters such as dibenzyl oxalate, di(4-methylbenzyl)oxalate, di(4-chlorobenzyl)oxalate, a mixture of dibenzyl oxalate and di(4-chlorobenzyl) oxalate in equal amounts, and a mixture of di(4-chlorobenzyl)oxalate and di(4-methylbenzyl)oxalate in equal amounts; bis(t-butylphenols) such as 2,2'-methylenebis(4-methyl-6-t-butylphenol) and 4,4'-methylene-bis-2,6-di-t-butylphenol; 4,4'-dihydroxydiphenylsulfone diethers such as 4,4'-dimethoxydiphenylsulfone, 4,4'-diethoxydiphenylsulfone, 4,4'-dipropoxydiphenylsulfone, 4,4'-diisopropoxydiphenylsulfone, 4,4'-dibutoxydiphenylsulfone, 4,4'-diisobutoxydiphenylsulfone, 4,4'-dipentyloxydiphenylsulfone, 4,4'-dihexyloxydiphenylsulfone, and 4,4'-diallyloxydiphenylsulfone; 2,4'-dihydroxydiphenylsulfone diethers such as 2,4'-dimethoxydiphenylsulfone, 2,4'-diethoxydiphenylsulfone, 2,4'-dipropoxydiphenylsulfone, 2,4'-diisopropoxydiphenylsulfone, 2,4'-dibutoxydiphenylsulfone, 2,4'-diisobutoxydiphenylsulfone, 2,4'-dipentyloxydiphenylsulfone, 2,4'-dihexyloxydiphenylsulfone, and 2,4'-diallyloxydiphenylsulfone; 1,2-bis(phenoxy)ethane, 1,2-bis(4-methylphenoxy)ethane, 1,2-bis(3-methylphenoxy) ethane, 1,2-bis(phenoxymethyl)benzene, 1,2-bis(4-methoxyphenylthio)ethane, 1,2-bis(4-methoxyphenoxy) propane, 1,3-phenoxy-2-propanol, 1,4-diphenylthio-2-butene, 1,4-diphenylthiobutane, 1,4-diphenoxy-2-butene, 1,5-bis(4-methoxyphenoxy)-3-oxapentane, 1,3-dibenzoyloxypropane, dibenzoyloxymethane, 4,4'-ethylenedioxy-bis-benzoic acid dibenzyl ester, bis[2-(4-methoxy-phenoxy) ethyl]ether, 2-naphthylbenzyl ether, 1,3-bis(2-vinyloxyethoxy)benzene, 1,4-diethoxynaphthalene, 1,4-dibenzyloxynaphthalene, 1,4-dimethoxynaphthalene, 1,4-bis(2-vinyloxyethoxy)benzene, p-(2-vinyloxyethoxy) biphenyl, p-aryloxybiphenyl, p-propargyloxybiphenyl, p-benzyloxybenzyl alcohol, 4-(m-methylphenoxymethyl)biphenyl, 4-methylphenyl-biphenyl ether, di-p-naphthylphenylenediamine, diphenylamine, carbazole, 2,3-di-m-tolylbutane, 4-benzylbiphenyl, 4,4'-dimethylbiphenyl, terphenyls such as m-terphenyl and p-terphenyl; 1,2-bis(3,4-dimethylphenyl)ethane, 2,3,5,6-tetramethyl-4'-methyldiphenylmethane, 4-acetylbiphenyl, dibenzoylmethane, triphenylmethane, phenyl 1-hydroxy-naphthoate, methyl 1-hydroxy-2-naphthoate, N-octadecylcarbamoyl-p-methoxycarbonylbenzene, benzyl p-benzyloxybenzoate, phenyl β-naphthoate, methyl p-nitrobenzoate, diphenylsulfone, carbonic acid derivatives such as diphenyl carbonate, guaiacol carbonate, di-p-tolyl carbonate, and phenyl-α-naphthyl carbonate; 1,1-diphenylpropanol, 1,1-diphenylethanol, N-octadecylcarbamoylbenzene, dibenzyl disulfide, stearic acid, Amide AP-1 (7:3 mixture of stearic acid amide and palmitic acid amide), stearates such as aluminum stearate, calcium stearate, and zinc stearate; and zinc palmitate, behenic acid, zinc behenate, montanic acid wax, and polyethylene wax.

Exemplary examples thereof can include 2-naphthylbenzyl ether, m-terphenyl, 4-benzylbiphenyl, benzyl oxalate, di(4-chlorobenzyl)oxalate, a mixture of benzyl oxalate and di(4-chlorobenzyl)oxalate in equal amounts, di(4-methylbenzyl)oxalate, a mixture of di(4-chlorobenzyl)oxalate and di(4-methylbenzyl)oxalate in equal amounts, phenyl 1-hydroxy-2-naphthoate, 1,2-bis(phenoxy)ethane, 1,2-bis(3-methylphenoxy)ethane, 1,2-bis(phenoxymethyl)benzene, dimethyl terephthalate, stearic acid amide, Amide AP-1(7:3 mixture of stearic acid amide and palmitic acid amide), diphenylsulfone, and 4-acetylbiphenyl.

Particularly exemplary examples thereof can include di(4-methylbenzyl)oxalate, 1,2-bis(3-methylphenoxy)ethane, 1,2-bis(phenoxymethyl)benzene, diphenylsulfone, and 2-naphthylbenzyl ether (benzyl-2-naphthyl ether).

Examples of the filler can include silica, clay, kaolin, fired kaolin, talc, satin white, aluminum hydroxide, calcium carbonate, magnesium carbonate, zinc oxide, titanium oxide, barium sulfate, magnesium silicate, aluminum silicate, plastic pigments, diatomaceous earth, talc, and aluminum hydroxide. Among them, preferable examples thereof can include fired kaolin and calcium carbonate. The proportion of the filler used is 0.1 to 15 parts by mass, preferably 1 to 10 parts by mass, with respect to 1 part by mass of the color former. Moreover, these fillers may be mixed for use.

Examples of the dispersant can include: polyvinyl alcohols having various degrees of saponification and polymerization, such as polyvinyl alcohol, acetoacetylated polyvinyl alcohol, carboxy-modified polyvinyl alcohol, sulfonic acid-modified polyvinyl alcohol, amide-modified polyvinyl alcohol, and butyral-modified vinyl alcohol, cellulose derivatives such as methylcellulose, carboxymethylcellulose, hydroxyethylcellulose, ethylcellulose, acetylcellulose, and hydroxymethylcellulose, and sodium polyacrylate, polyacrylic acid ester, polyacrylamide, starch, sulfosuccinic acid esters such as dioctyl sodium sulfosuccinate, sodium dodecylbenzenesulfonate, a sodium salt of lauryl alcohol sulfonic acid ester, fatty acid salt, styrene-maleic anhydride copolymers, styrene-butadiene copolymers, polyvinyl chloride, polyvinyl acetate, polyacrylic acid ester, polyvinylbutyral, polyurethane, polystyrene and copolymers thereof, polyamide resins, silicone resins, petroleum resins, terpene resins, ketone resins, and coumarone resins.

The dispersant is used after being dissolved in a solvent such as water, alcohol, ketone, ester, or hydrocarbon. Alternatively, the dispersant may be used in a state emulsified in water or other solvents or in the form of paste dispersed therein.

Examples of the antioxidant can include 2,2'-methylenebis(4-methyl-6-t-butylphenol), 2,2'-methylenebis(4-ethyl-6-t-butylphenol), 4,4'-propylmethylenebis(3-methyl-6-t-butylphenol), 4,4'-butylidenebis(3-methyl-6-t-butylphenol), 4,4'-thiobis(2-t-butyl-5-methylphenol), 1,1,3-tris(2-methyl- 4-hydroxy-5-t-butylphenyl)butane, 1,1,3-tris(2-methyl-4-hydroxy-5-cyclohexylphenyl)butane, 4-{4-[1,1-bis(4-hydroxyphenyl)ethyl]-α,α-dimethylbenzyl}phenol, 1,1,3-tris(2-methyl-4-hydroxy-5-cyclohexylphenyl)butane, 2,2'-methylenebis(6-tert-butyl-4-methylphenol), 2,2'-methylenebis(6-tert-butyl-4-ethylphenol), 4,4'-thiobis(6-tert-butyl-3-methylphenol), 1,3,5-tris[{4-(1,1-dimethylethyl)-3-hydroxy-2,6-dimethylphenyl}methyl]-1,3,5-triazine-2,4,6(1H, 3H, 5H)-trione, and 1,3,5-tris[{3,5-bis(1,1-dimethylethyl)-4-hydroxyphenyl}methyl]-1,3,5-triazine-2,4,6(1H, 3H, 5H)-trione.

Examples of the desensitizer can include aliphatic higher alcohols, polyethylene glycol, and guanidine derivatives.

Examples of the anti-tack agent can include stearic acid, zinc stearate, calcium stearate, carnauba wax, paraffin wax, and ester wax.

Examples of the antifoaming agent can include higher alcohol, fatty acid ester, oil, silicone, polyether, modified hydrocarbon, and paraffin antifoaming agents.

Examples of the light stabilizer can include: salicylic acid UV absorbers such as phenyl salicylate, p-t-butylphenyl salicylate, and p-octylphenyl salicylate; benzophenone UV absorbers such as 2,4-dihydroxybenzophenone, 2-hydroxy-4-methoxybenzophenone, 2-hydroxy-4-benzyloxybenzophenone, 2-hydroxy-4-octyloxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl)methane; benzotriazole UV absorbers such as 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-5'-tert-butylphenyl)benzotriazole, 2-(2'-hydroxy-5'-(1",1",3",3"-tetramethylbutyl)phenyl)benzotriazole, 2-[2'-hydroxy-3'-(3",4",5",6"-tetrahydrophthalimidomethyl)-5'-methylphenyl]benzotriazole, 2-(2'-hydroxy-5'-t-octylphenyl)benzotriazole, 2-[2'-hydroxy-3',5'-bis(α,α-dimethylbenzyl)phenyl]-2H-benzotriazole, 2-(2'-hydroxy-3'-dodecyl-5'-methylphenyl)benzotriazole, 2-(2'-hydroxy-3-undecyl-5'-methylphenyl)benzotriazole, 2-(2'hydroxy-3'-tridecyl-5'-methylphenyl)benzotriazole, 2-(2-hydroxy-3'-tetradecyl-5'-methylphenyl)benzotriazole, 2-(2'-hydroxy-3'-pentadecyl-5'-methylphenyl)benzotriazole, 2-(2'-hydroxy-3'-hexadecyl-5'-methylphenyl)benzotriazole, 2-[2'-hydroxy-4'-(2"-ethylhexyl)oxyphenyl]benzotriazole, 2-[2'-hydroxy-4'-(2"-ethylheptyl)oxyphenyl]benzotriazole, 2-[2'-hydroxy-4'-(2"-ethyloctyl)oxyphenyl]benzotriazole, 2-[2'-hydroxy-4'-(2"-propyloctyl)oxyphenyl]benzotriazole, 2-[2'-hydroxy-4'-(2"-propylheptyl)oxyphenyl]benzotriazole, 2-[2'-hydroxy-4'-(2"-propylhexyl)oxyphenyl]benzotriazole, 2-[2'-hydroxy-4'-(1"-ethylhexyl)oxyphenyl]benzotriazole, 2-[2'-hydroxy-4'-(1"-ethylheptyl)oxyphenyl]benzotriazole, 2-[2'-hydroxy-4'-(1'-ethyloctyl)oxyphenyl]benzotriazole, 2-[2'-hydroxy-4'-(1"-propyloctyl)oxyphenyl]benzotriazole, 2-[2'-hydroxy-4'-(1"-propylheptyl)oxyphenyl]benzotriazole, 2-[2'-hydroxy-4'-(1"-propylhexyl)oxyphenyl]benzotriazole, 2,2'-methylenebis[4-(1,1,3,3-tetramethylbutyl)-6-(2H-benzotriazol-2-yl)]phenol, and a condensate of polyethylene glycol and methyl-3-[3-t-butyl-5-(2H-benzotriazol-2-yl)-4-hydroxyphenyl]propionate; cyanoacrylate UV absorbers such as 2'-ethylhexyl-2-cyano-3,3-diphenylacrylate and ethyl-2-cyano-3,3-diphenylacrylate; hindered amine UV absorbers such as bis(2,2,6,6-tetramethyl-4-piperidyl)sebacate, succinic acid-bis(2,2,6,6-tetramethyl-4-piperidyl)ester, and 2-(3,5-di-t-butyl)malonic acid-bis(1,2,2,6,6-pentamethyl-4-piperidyl)ester; and 1,8-dihydroxy-2-acetyl-3-methyl-6-methoxynaphthalene.

Examples of the fluorescent brightening agent can include 4,4'-bis[2-anilino-4-(2-hydroxyethyl)amino-1,3,5-triazinyl-6-amino]stilbene-2,2'-disulfonic acid disodium salt, 4,4'-bis[2-anilino-4-bis(hydroxyethyl)amino-1,3,5-triazinyl-6-amino]stilbene-2,2'-disulfonic acid disodium salt, 4,4'-bis[2-anilino-4-bis(hydroxypropyl)amino-1,3,5-triazinyl-6-amino]stilbene-2,2'-disulfonic acid disodium salt, 4,4'-bis[2-methoxy-4-(2-hydroxyethyl)amino-1,3,5-triazinyl-6-amino]stilbene-2,2'-disulfonic acid disodium salt, 4,4'-bis[2-methoxy-4-(2-hydroxypropyl)amino-1,3,5-triazinyl-6-amino]stilbene-2,2'-disulfonic acid disodium salt, 4,4'-bis[2-m-sulfoanilino-4-bis(hydroxyethyl)amino-1,3,5-triazinyl-6-amino]stilbene-2,2'-disulfonic acid disodium salt, 4-[2-p-sulfoanilino-4-bis(hydroxyethyl)amino-1,3,5-triazinyl-6-amino]-4'-[2-m-sulfoanilino-4-bis(hydroxyethyl)amino-1,3,5-triazinyl-6-amino]stilbene-2,2'-disulfonic acid tetrasodium salt, 4,4'-bis[2-p-sulfoanilino-4-bis(hydroxyethyl)amino-1,3,5-triazinyl-6-amino]stilbene-2,2'-disulfonic acid tetrasodium salt, 4,4'-bis[2-(2,5-disulfoanilino)-4-phenoxy amino-1,3,5-triazinyl-6-amino]stilbene-2,2'-disulfonic acid hexasodium salt, 4,4'-bis[2-(2,5-disulfoanilino)-4-(p-methoxycarbonylphenoxy)amino-1,3,5-triazinyl-6-amino]stilbene-2,2'-disulfonic acid hexasodium salt, 4,4'-bis[2-(p-sulfophenoxy)-4-bis(hydroxyethyl)amino-1,3,5-triazinyl-6-amino]stilbene-2,2'-disulfonic acid hexasodium salt, 4,4'-bis[2-(2,5-disulfoanilino)-4-formalinylamino-1,3,5-triazinyl-6-amino]stilbene-2,2'-disulfonic acid hexasodium salt, and 4,4'-bis[2-(2,5-disulfoanilino)-4-bis(hydroxyethyl)amino-1,3,5-triazinyl-6-amino]stilbene-2,2'-disulfonic acid hexasodium salt.

Method for Producing Heat Sensitive Recording Material

When embodiments described herein are used in thermal recording paper, the paper may be produced in a conventional manner. For example, the thermal recording paper can be produced by separately dispersing fine particles of the color developer compounds described herein and fine particles of a color former in aqueous solutions of water-soluble binders such as polyvinyl alcohol or cellulose, mixing these suspension solutions, applying the mixture to a support such as paper, and drying it.

When embodiments described herein are used in pressure-sensitive copying paper, the pressure-sensitive copying paper can be produced in the same way as in use of a known color-developing agent or sensitizer. For example, a color former microencapsulated by a method known in the art is dispersed in an appropriate dispersant and applied to paper to prepare a sheet of the color former. Moreover, a dispersion solution of a color-developing agent is applied to paper to prepare a sheet of the color-developing agent. Both the sheets thus prepared are combined to prepare pressure-sensitive copying paper. The pressure-sensitive copying paper may be a unit consisting of: upper paper carrying a microcapsule containing a solution of a color former in an organic solvent, wherein the microcapsule is applied on the underside of the upper paper; and lower paper carrying a color-developing agent (acidic substance) applied on the top surface of the lower paper. Alternatively, the pressure-sensitive copying paper may be so-called self-contained paper comprising the microcapsule and the color-developing agent applied on the same paper surface.

Those conventionally known are used as the color-developing agent used in the production or the color-developing agent mixed with the compound of embodiments described herein for use. Examples thereof can include: inorganic acidic substances such as Japanese acid clay, activated clay, attapulgite, bentonite, colloidal silica, aluminum silicate, magnesium silicate, zinc silicate, tin silicate, fired kaolin, and talc; aliphatic carboxylic acids such as oxalic acid, maleic acid, tartaric acid, citric acid, succinic acid, and stearic acid; aromatic carboxylic acids such as benzoic acid, p-t-butylbenzoic acid, phthalic acid, gallic acid, salicylic acid, 3-isopropylsalicylic acid, 3-phenylsalicylic acid, 3-cyclohexylsalicylic acid, 3,5-di-t-butylsalicylic acid, 3-methyl-5-benzylsalicylic acid, 3-phenyl-5-(2,2-dimethylbenzyl)salicylic acid, 3,5-di-(2-methylbenzyl)salicylic acid, and 2-hydroxy-1-benzyl-3-naphthoic acid, and metal (e.g., zinc, magnesium, aluminum, and titanium) salts of these aromatic carboxylic acids; phenol resin color-developing agents such as p-phenylphenol-formalin resins and p-butylphenol-acetylene resins, and mixtures of these phenol resin color-developing agents and the metal salts of the aromatic Paper, synthetic paper, a film, a plastic film, a foamed plastic film, nonwoven cloth, recycled paper (e.g., recycled paper pulps), or the like, conventionally known can be used as the support according to embodiments herein. Moreover, the combination thereof can also be used as the support.

If paper is used as the support, a dispersion solution containing a dispersion solution of a color former, a dispersion solution of a color-developing agent, and a dispersion solution of a filler can be directly applied to the paper, or the dispersion solution can be applied after applying a dispersion solution for an undercoat layer to the paper and drying it. Preferably, the dispersion solution for the undercoat layer is applied before applying the dispersion solution because better color-developing sensitivity is thus attained.

The dispersion solution for the undercoat layer is used for improving the smoothness on the surface of the support and is not particularly limited, but preferably contains a filler, a dispersant and water, and specifically, fired kaolin or calcium carbonate is preferred as the filler, and polyvinyl alcohol is preferred as the dispersant.

Examples of methods for forming a recording material layer on the support include a method comprising applying a dispersion solution containing a dispersion solution of a color former, a dispersion solution of a color-developing agent, and a dispersion solution of a filler to a support, followed by drying, a method comprising spraying such a dispersion solution onto a support with a spray or the like, followed by drying, and a method comprising dipping a support in such a dispersion solution for a given time, followed by drying. Moreover, examples of the application method include hand coating, a size press coater method, a roll coater method, an air knife coater method, a blend coater method, a flow coater method, a curtain coater method, a comma direct method, a gravure direct method, a gravure reverse method, and a reverse roll coater method.

Method for Coating

In an exemplary method, the heat sensitive recording layer coating composition is applied to the support in an amount of from about 1 to about 10 g/m$^2$, such as from about 3 to about 7 g/m$^2$ on a dry weight basis. The heat sensitive recording layer coating composition may be applied to the support by a known coating device such as a coating bar, a roll coater, an air knife coater, a blade coater, a gravure coater, a die coater or a curtain coater.

If desired, an undercoat layer can also be provided between the support and the heat sensitive recording layer in order to improve the thermal sensitivity and efficiency during recording. The undercoat layer may be formed by coating the support with an undercoat layer coating composition comprising as main components organic hollow particles and/or an oil absorbing pigment and a binder and then drying the coating. Representative examples of oil absorbing pigments include kaolin, calcined kaolin, amorphous silica, precipitated calcium carbonate and talc. The average pigment diameter may be from about 0.01 to about 5 m, such as from about 0.02 to about 3 m.

Representative examples of organic hollow particles include particles having a shell made from an acrylic resin, styrene-based resin and vinylidene chloride-based resin and having a void ratio of from about 50 to about 99%. In an exemplary embodiment, the outside diameter of the organic hollow particle may be from about 0.5 to about 10 m, such as from about 1 to about m. Exemplary organic hollow particles may be expandable hollow particles. A typical example of such expandable hollow particles are microcapsules having an average diameter of from about 0.1 to about 5 m and including a vinylidene chloride resin shell and butane gas as fill material. When a support coated with an undercoat layer comprising such expandable hollow particles is subjected to heat treatment, the microcapsules expand to an average particle diameter of from about 1 to about 30 m. In embodiments in which the oil absorbing pigment is used in combination with the organic hollow particles, the combined amount of the two components may be from about 40 to about 90% by weight, for example from about 50 to about 80% by weight, based on the undercoat layer.

Exemplary binders used in the undercoat layer may be selected from the binders to be used in the heat sensitive recording layer. In particular, exemplary binders are styrene-butadiene latex, a polyvinyl alcohol or starch-vinyl acetate copolymer. An exemplary amount of binder is from about 5 to about 30% by weight, for example, from about 10 to about 20% by weight, based on the undercoat layer. In exemplary embodiments, the undercoat recording layer coating composition is applied to the support in an amount of from about 2 to about 20 g/m$^2$, such as from about 4 to about 12 g/m$^2$ on a dry weight basis.

If desired, a protective layer may be provided on the heat sensitive recording layer to enhance the resistance of the recorded image to water and chemicals, for example, oils, fats, alcohols, plasticisers and the like to improve the runability during recording. Generally, the protective layer may be formed by coating the heat sensitive recording layer with a protective layer coating composition including as main components a binder having film-forming ability and optionally, a pigment and/or an insolubiliser, and/or a lubricant, and then drying the resulting coating film.

Representative examples of the binder to be used in the protective layer coating composition include polyvinyl alcohol (fully or partially hydrolysed), carboxy-modified polyvinyl alcohol, acetoacetyl-modified polyvinyl alcohol, diacetone-modified polyvinyl alcohol, silicon modified polyvinyl alcohol, starches, gelatin, casein, gum arabic, derivatives of cellulose such as hydroxyethyl cellulose, methyl cellulose, ethyl cellulose, carboxymethyl cellulose and acetyl cellulose, starch vinyl acetate graft copolymers, styrene-maleic anhydride copolymers, methyl vinyl ether-maleic anhydride copolymers, isopropylene-maleic anhydride copolymers and like water-soluble resins, styrene-butadiene latex, acrylic latex, urethane latex and like water-dispersible resins and mixtures thereof.

The protective layer coating composition may further include pigment, insolubiliser, lubricant and, if required, other auxiliaries that are selected from those used in the heat sensitive recording layer coating composition as described above.

In exemplary embodiments, the protective layer coating composition may be applied in an amount of from about 0.5 to about 10 $g/m^2$, such as from about 1 to 5 $g/m^2$ on a dry weight basis and may be applied with a similar coating device to that used to coat the heat sensitive layer.

It is also possible to provide a protective layer, an adhesive layer, and a magnetic layer on the rear side of the support.

The following non-limiting examples illustrate further aspects of embodiments described herein.

There are several methods for printing the coated thermal paper: by heat (thermoprinter) or by light (laser).

For example, the coated thermal paper may be printed by laser marking or printing, such as by $CO_2$ (IR irradiation having a wavelength in the range of 780 to 1,000,000 nm. In exemplary embodiments, in a laser marking/printing process the energy is IR irradiation generated by a $CO_2$ laser or a Nd:YAG laser. For example, the energy may be IR irradiation generated by a $CO_2$ laser having a wavelength of 10600 nm.

Typically the exact power of the IR laser and the line speed is determined by the application and chosen to be sufficient to generate the image, for example, when the wavelength of the IR laser is 10600 nm and the diameter of the laser beam is 0.35 mm, the power is typically 0.5 to 4 W, and the marking speed is typically 300 to 1500 mm/s.

EXAMPLES

Example 1 Corresponds to PERGAFAST 425 Powder-Material Synthesis

Example 1a: Synthesis of 5-Sulfonylchloride-Isophthalic Acid Dichloride

To a mixture of 42 g (150 mmol) of 5-sulfo-isophthalic acid sodium salt (95%, Sigma-Aldrich Inc.) and 160 ml (2200 mmol) thionyl chloride (>99% GC, Fluka), 10 ml of N,N-dimethylformamide were added under stirring. The suspension was slowly heated to reflux and kept at reflux conditions for two hours during which the formation of HCl and $SO_2$ indicated the progress of the reaction. After the formation of gas ceased, the reaction mixture was cooled down to room temperature. The yellowish suspension obtained was poured slowly onto 1000 g of ice flakes under stirring during which the slightly pinkish product precipitated. After stirring for 30 min at below 5° C. the precipitate was filtered. The thus obtained wet filter cake was deep frozen and freeze-dried in order to avoid premature hydrolysis.

Yield: 45.5 g slightly yellowish powder. NMR (d6-DMSO): 9.15 (1H), 9.04 (2H).

Example 1b: 5-(N-3-Methylphenyl-sulfonylamido)-(N',N"-bis-(3-methylphenyl)-isophthalic acid-diamide (toluene)

1.5 g (5 mmol) 5-Sulfonylchloride-isophthalic acid dichloride (as synthesized in example 1a) were dispersed in 20 ml toluene at room temperature. To the white dispersion 3.3 g (30.9 mmol) 3-methyl-aniline were slowly added. A further 60 ml toluene were added to the crude suspension which was then heated to 100° C. and stirred for 18 h. After cooling to room temperature, the precipitate was filtered and washed with 30 ml toluene, followed by the addition of 50 ml demineralized water and 30 ml HCl (10%). The compound was dried under reduced pressure (200 mbar) at 40° C.

Yield: 2 g of a reddish product

Recrystallisation 10 g raw 5-(N-3-methylphenyl-sulfonylamido)-(N',N"-bis-(3-methylphenyl)-isophthalic acid diamide obtained in example 1b were dissolved in 350 ml methanol under reflux conditions resulting in a clear solution. 35 ml water were added after which some slight haze could be observed. The mixture was slowly cooled to room temperature during 2 h. The white precipitated needles were filtered off, washed with 50 ml of demineralized water and dried at 50° C. under reduced pressure (200 mbar).

Yield: 52%.

Melting point (DSC, 4° C./min): 195.3° C., 215.2° C., (different crystal modifications)

NMR (d6-DMSO): 2.20 (3H), 2.32 (6H), 6.85 (1H), 6.92 (1H), 6.96 (3H), 7.11 (1H), 7.26 (2H), 7.58 (4H), 8.46 (2H), 8.73 (1H), 10.45 (1H), 10.53 (2H)

Example 1c: Directed Synthesis of the α-modification of 5-(N-3-methylphenyl-sulfonylamido)-(N',N"-bis-(3-methylphenyl)-isophthalic acid-diamide To a mixture of 49.0 g (0.16 mol) of 5-sulfonylchloride-isophthalic acid dichloride (as synthesized in example 1a) and 500 ml of toluene at 22° C., 110 ml (0.99 mol) m-toluidine were added dropwise within 30 minutes. Then, again additional 500 ml toluene were added. The product mixture obtained was heated to 100° C. Then 1500 ml of toluene were added, and the reaction mixture was kept at 100° C. for 3 hours. Afterwards, the reaction mixture was allowed to cool to 22° C. The precipitate formed was filtered off. The filter cake obtained was suspended in 250 ml of water under stirring. This suspension was heated to 80° C. for 30 min. The aqueous layer was removed by decantation at 80° C. Then 200 ml of 10% by weight hydro chloric acid was added to the residue and the mixture was stirred for 30 min at 40° C. Then, the aqueous layer was decanted once more. Thereafter, 800 ml of n-heptane were added to the residue and stirred for 30 minutes at 22° C. The precipitate was collected by filtration and dried under the reduced pressure of a vacuum pump at 60° C.

Yield: 81 g (96%), white solid, m.p. 211.2° C. (DSC)

Example 1d: Directed synthesis of the β-modification of 5-(N-3-methylphenyl-sulfonylamido)-(N',N"-bis-(3-methylphenyl)-isophthalic acid-diamide To a mixture of 10.8 g (0.1 mol) of m-toluidine in 50 ml tetrahydrofuran at 22° C. a solution of 5.0 g (0.0166 mol) 5-sulfonylchloride-isophthalic acid dichloride (as synthesized in example 1a) in 15 m tetrahydrofuran were added dropwise within 15 min under stirring. The reaction mixture was then heated to 65° C. for 5 hours. The formed precipitate was removed by filtration. The filtrate was dried under the reduced pressure of a vacuum pump. The obtained residue was taken up into 25 ml tetrahydrofuran. The solution obtained was then poured into 100 ml of a methanol/water (9:1) mixture and heated to 50° C. for one hour. Afterwards, the reaction mixture was cooled down to 22° C. The solid obtained was collected by filtration and washed with methanol. The product was then dried under reduced pressure at 60° C. for 7 hours.

Yield: 5.0 g (58%), white solid, m.p. 192.2° C. (DSC)

Example 1e: Directed Synthesis of the 7-modification of 5-(N-3-methylphenyl-sulfonylamido)-(N',N"-bis-(3-methylphenyl)-isophthalic acid-diamide To a mixture of 10.8 g (0.1 mol) m-toluidine in 75 ml n-heptane, 5 g (0.0166 mol) 5-sulfonylchloride-isophthalic acid dichloride (as synthesized in example 1a) in 20 ml toluene were added dropwise within 45 minutes at 75° C. The reaction mixture was then heated to 90° C. for 5 hours, then cooled to 60° C. Subsequently, 50 ml of water followed by 5 ml of concentrated hydrochloric acid were added at this temperature, and then stirred for another 15 minutes at 60° C. Afterwards, the solid phase obtained was filtered off at this temperature. Thereafter, the filter cake obtained was washed first with 50 ml of water, then with 50 ml of n-heptane and subsequently dried on a suction filter by sucking air through the filter using a vacuum pump for 1 hour. The thus dried filter cake was suspended in 90 ml of a methanol/water mixture (9:1) and the suspension was stirred for two hours at 60° C. After cooling the suspension to 20° C., the precipitate obtained was filtered off and washed with 50 ml of a methanol/water mixture (1:1). Afterwards, the product was dried under the reduced pressure of a vacuum pump at 60° C. for 7 hours.

Yield: 7.0 g (white solid) 82%, m.p. 215.6° C., determined by DSC.

Example 1f

One Step Procedure for the Synthesis of 5-(N-3-methylphenyl-sulfonyl-amido)-(N',N"-bis-(3-methylphenyl)-isophthalic acid diamide

Step 1: Synthesis of 5-sulfonylchloride-isophthalic acid dichloride

A suspension of 150 ml (2.1 mol) thionyl chloride and 125 g (0.47 mol) 5-sulfo isophthalic acid sodium salt was heated to 70° C. At this temperature, a solution of 3.4 g (0.05 mol) N,N-dimethylformamide in 100 ml thionyl chloride is added via a dropping funnel over a period of 1.5 hours. The reaction mixture was stirred for 2.5 hours at 70-75° C. until the gas evolution stopped. The formation of crude acid chloride was monitored by LC. After complete reaction, the excess of thionyl chloride was removed by distillation. The acid chloride was obtained as jelly mass along with fine sodium chloride crystals. The mass was filtered, and the filtrate was collected. 350 ml of toluene are added to the filtrate to obtain 450-500 g of a solution of 5-sulfonylchloride isophthalic acid dichloride.

Step 2: Conversion of 5-sulfonylchloride-isophthalic Acid Dichloride to Corresponding Acid Acid Tris-Amide A solution of 3 g Surfynol 104 PG 50 (50% solution in propylene glycol, Evonik) and 27 g (0.33 mol) sodium bicarbonate in 300 ml water was stirred at 20° C. 35 g (0.33 mol) of m-toluidine was added in one portion. The solution was heated to 30-40° C. A solution of 100 g (~0.1 mol) intermediate solution prepared in step 1 is added over a period of 1.5 hours. The formed reaction suspension was heated-up to 50-55° C. and kept at this temperature under stirring for 2 hours. The reaction was monitored by LC. When the conversion was complete, the reaction mixture was cooled to 20° C. The formed precipitate was collected by the filtration at a suction filter. The obtained crude wet cake was washed with around 210 ml of water, then with 210 ml of toluene and afterwards dried for 12 hours under vacuum at 50° C.

Yield: 45 g (86%), white solid, bulk density 550 kg/m3.

An X-ray powder pattern of this material is having Bragg angles (2θ/CuKα) of 5.4±0.2, 6.1±0.2, 6.3±0.2, 11.9±0.2, 12.6±0.2, 15.9±0.2, 16.6±0.2, 16.9±0.2, 18.1±0.2, 19.1±0.2, 19.7±0.2, 20.3±0.2, 22.0±0.2, 22.5±0.2, 23.1±0.2, 24.1±0.2, 24.9±0.2, 25.4±0.2, 26.3±0.2, 27.7±0.2.

Example 2

Second Non-Phenolic developer NKK-1304 is prepared according to methods of synthesis disclosed in EP 2 923 851 and/or via the synthesis of intermediate 1-(2-aminophenyl) $_3$-phenylurea which was prepared according to literature (C. J. Perry, Synthetic Commun. 38 (19) 3354 (2008) from reaction of o-phenylendiamine and phenylisocyanate and further reacted to NKK-1304 in analogy to the procedure given in literature (P. Singh et al, J. Mater. Chemistry C, 3, 5524 (2015). The final product and compound is represented by the following formula (I):

(I)

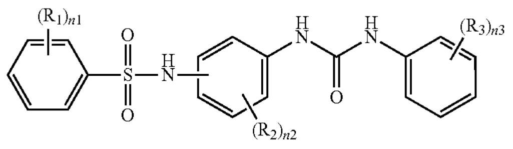

In a particular embodiment, the color developer called NKK-1304 herein is used and corresponds to the general formula (I) above in which $R_1$, $R_2$ and $R_3$ are all hydrogen atoms.

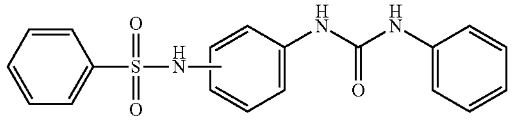

Example 3

Second Non-Phenolic developer PERGAFAST 201 used in the below evaluation is a commercial grade from SOLENIS company with the following structure:

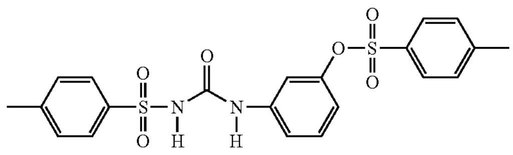

Milling of Color Developers:

Preparation of Color Developer Dispersion A (SOLUTION A)

A mixture of 11 g of 5-(N-3-methylphenyl-sulfonylamido)-(N',N"-bis-(3-methylphenyl)-isophthalic acid diamide, 0.2 g of the surfactant 2,4,7,9-tetramethyl-5-decyne-4,7-diol (Surfynol® 104 from Evonik), 8.9 g of a aqueous solution (as 10%) of Gohsenx™ L-3266 (sulfonated polyvinyl alcohol, Nippon Gohsei) as dispersing aid and binder and 20 g demineralized water was milled in a bead mill to a median particle size diameter of 1.0 m to obtain color developer dispersion A.

In a similar way, the following color developer dispersions were made as comparison:

| Dispersion | Compound |
|---|---|
| Dispersion B = SOLUTION B | 1-[2-(benzenesulfonylamido)-phenyl]-3-phenylurea (NKK-1304) |
| Dispersion C = SOLUTION C | [3-(p-tolylsulfonylcarbamoylamino)phenyl] 4-methylbenzenesulfonate (PF-201) |

Preparation of Color Former Dispersion D (SOLUTION D)

A mixture of 15 g of 3-dibutylamino-6-methyl-7-anilinofluoran (Pergascript Black 2C, BASF SE), 30 g of a 10% by weight solution of a polyvinyl alcohol (Mowiol® 40-88, polyvinylalcohol, Mw~205.000 g/mol, Sigma-Aldrich Inc./Kuraray Europe GmbH), 0.3 g of the surfactant 2,4,7,9-tetramethyl-5-decyne-4,7-diol (Surfynol® 104 from Evonik) as 20% solution in isopropanol and 15 g of water was milled in a bead mill to an average particle diameter of 1.0 m to obtain Dispersion D.

Preparation of Sensitizer Dispersion E (SOLUTION E)

A mixture of 11.3 g of benzyl-2-naphthyl ether (Pergaspeed 305, BASF SE), 2.3 g of a 5% solution of dispersing agent (sodium salt of naphthalene sulfonic acid condensation product with formaldehyde, TAMOL® NN 9401 from BASF SE) in water, 5.7 g of a 10% by weight solution of a polyvinyl alcohol (Mowiol® 40-88 (Polyvinylalcohol, Mw~205.000, Sigma-Aldrich Inc./Kuraray Europe GmbH) and 20.8 g of water is milled in a bead mill to an average particle diameter of 1.0 m to obtain Dispersion E.

Preparation of Filler Dispersion F (SOLUTION F)

A mixture of 15.8 g precipitated calcium carbonate (Socal P3 from Solvay), 0.4 g of an aqueous solution of a dispersing agent (sodium polyacrylate (DISPEX® AA 4140 from BASF SE), pH 7.5, active content 40% by weight), and 23.8 g of water was milled in a bead mill to an average particle diameter of 1.0 m to obtain Dispersion F.

Thermosensitive Coloring Liquids & Coatings Preparations:

Application example C1: preparation of a heat-sensitive recording layer coating compositions 15 g of dispersion A, 6.5 g of dispersion D, 11.5 g of dispersion E, 16 g of dispersion F, 19 g of a 10% by weight aqueous solution of a polyvinyl alcohol (Mowiol® 28-99, polyvinylalcohol, Kuraray Europe GmbH), 3 g of a 17% aqueous dispersion of zinc stearate (Hidorin® F115 from Chukyo Europe), 1.5 g of a 25% fatty acid amide emulsion (Hymicron L-271 from Chukyo Europe) and 58 g of distilled water were mixed and stirred to obtain a heat sensitive recording layer coating composition.

A base paper coated with calcined kaolin (Ansilex® 93 from BASF SE, coating weight 7 g/m$^2$) was coated with the above heat sensitive recording layer coating composition using an adapted wire bar (#6) to reach a dry color former coating weight of 0.5 g/m$^2$ and dried with hot air blower. This coated thermosensitive sheet is stored at 40° C. during 24 hours. The resulting heat sensitive recording layer coating composition was calendered with 25 kN with 2 passes, to obtain a smooth surface.

Application example $C_2$: preparation of a heat-sensitive recording layer coating compositions 12 g of dispersion A, 3 g of dispersion B, 6.5 g of dispersion D, 11.5 g of dispersion E, 16 g of dispersion F, 19 g of a 10% by weight aqueous solution of a polyvinyl alcohol (Mowiol® 28-99, polyvinylalcohol, Kuraray Europe GmbH), 3 g of a 17% aqueous dispersion of zinc stearate (Hidorin® F115 from Chukyo Europe), 1.5 g of a 25% fatty acid amide emulsion (Hymicron L-271 from Chukyo Europe) and 58 g of distilled water were mixed and stirred to obtain a heat sensitive recording layer coating composition.

A base paper coated with calcined kaolin (Ansilex® 93 from BASF SE, coating weight 7 g/m$^2$) was coated with the above heat sensitive recording layer coating composition using an adapted wire bar size (#6) to reach a dry color former coating weight of 0.5 g/m$^2$ and dried with hot air blower. This coated thermosensitive sheet is stored at 40° C. during 24 hours. The resulting heat sensitive recording layer coating composition was calendered with 25 kN with 2 passes, in order to obtain a smooth surface.

Application example C2 was repeated with different components to yield additional heat sensitive recording layer coating compositions from C2 to C6.

Table A summarizes the different combinations & compositions used.

Application example C7: preparation of a heat-sensitive recording layer coating compositions 15 g of dispersion B, 6.5 g of dispersion D, 11.5 g of dispersion E, 16 g of dispersion F, 19 g of a 10% by weight aqueous solution of a polyvinyl alcohol (Mowiol® 28-99, polyvinylalcohol, Kuraray Europe GmbH), 3 g of a 17% aqueous dispersion of zinc stearate (Hidorin® F115 from Chukyo Europe), 1.5 g of a 25% fatty acid amide emulsion (Hymicron L-271 from Chukyo Europe) and 58 g of distilled water were mixed and stirred to obtain a heat sensitive recording layer coating composition.

A base paper coated with calcined kaolin (Ansilex® 93 from BASF SE, coating weight 7 g/m$^2$) was coated with the above heat sensitive recording layer coating composition using an adapted wire bar (#6) to reach a dry color former coating weight of 0.5 g/m$^2$ and dried with hot air blower. This coated thermosensitive sheet is stored at 40° C. during 24 hours. The resulting heat sensitive recording layer coating composition was calendered with 25 kN with 2 passes, in order to obtain a smooth surface.

TABLE A

| | Thermal solution (parts by mass) | | | | | | |
|---|---|---|---|---|---|---|---|
| | C1 | C2 | C3 | C4 | C5 | C6 | C7 |
| Dispersion solution of color developer A (solution A) | 150 | 120 | 90 | 75 | 60 | 30 | 0 |
| Dispersion solution of color developer B (solution B) | 0 | 30 | 60 | 75 | 90 | 120 | 150 |

TABLE A-continued

| | Thermal solution (parts by mass) | | | | | | |
|---|---|---|---|---|---|---|---|
| | C1 | C2 | C3 | C4 | C5 | C6 | C7 |
| Dispersion solution of color developer C (solution C) | | | | | | | |
| Dispersion solution of color former (solution D) | 65 | 65 | 65 | 65 | 65 | 65 | 65 |
| Dispersion solution of sensitizer (solution E) | 115 | 115 | 115 | 115 | 115 | 115 | 115 |
| Dispersion solution of PCC (solution F) | 160 | 160 | 160 | 160 | 160 | 160 | 160 |
| 25% Aqueous Wax emulsion | 15 | 15 | 15 | 15 | 15 | 15 | 15 |
| 17% Aqueous zinc stearate emulsion | 30 | 30 | 30 | 30 | 30 | 30 | 30 |
| 10% Aqueous solution of polyvinyl alcohol | 190 | 190 | 190 | 190 | 190 | 190 | 190 |
| Color former dry coating weight (g/m$^2$) | 0.50 | 0.50 | 0.50 | 0.50 | 0.50 | 0.50 | 0.50 |

Application example C8: preparation of a heat-sensitive recording layer coating compositions 15 g of dispersion A, 6.5 g of dispersion D, 11.5 g of dispersion E, 16 g of dispersion F, 19 g of a 10% by weight aqueous solution of a polyvinyl alcohol (Mowiol® 28-99, polyvinylalcohol, Kuraray Europe GmbH), 3 g of a 17% aqueous dispersion of zinc stearate (Hidorin® F115 from Chukyo Europe), 1.5 g of a 25% fatty acid amide emulsion (Hymicron L-271 from Chukyo Europe) and 43 g of distilled water were mixed and stirred to obtain a heat sensitive recording layer coating composition.

A base paper coated with calcined kaolin (Ansilex® 93 from BASF SE, coating weight 7 g/m$^2$) was coated with the above heat sensitive recording layer coating composition using an adapted wire bar (#4) to reach a dry color former coating weight of 0.25 g/m$^2$ and dried with hot air blower. This coated thermosensitive sheet is stored at 40° C. for 24 hours. The resulting heat sensitive recording layer coating composition was calendered with 25 kN with 2 passes, to obtain a smooth surface.

Application example C9: preparation of a heat-sensitive recording layer coating compositions 12 g of dispersion A, 3 g of dispersion C, 6.5 g of dispersion D, 11.5 g of dispersion E, 16 g of dispersion F, 19 g of a 10% by weight aqueous solution of a polyvinyl alcohol (Mowiol® 28-99, polyvinylalcohol, Kuraray Europe GmbH), 3 g of a 17% aqueous dispersion of zinc stearate (Hidorin® F115 from Chukyo Europe), 1.5 g of a 25% fatty acid amide emulsion (Hymicron L-271 from Chukyo Europe) and 43 g of distilled water were mixed and stirred to obtain a heat sensitive recording layer coating composition.

A base paper coated with calcined kaolin (Ansilex® 93 from BASF SE, coating weight 7 g/m$^2$) was coated with the above heat sensitive recording layer coating composition using an adapted wire bar size (#4) to reach a dry color former coating weight of 0.25 g/m$^2$ and dried with hot air blower. This coated thermosensitive sheet is stored at 40° C. for 24 hours. The resulting heat sensitive recording layer coating composition was calendered with 25 kN with 2 passes, in order to obtain a smooth surface.

Application example C9 was repeated with different components to yield additional heat sensitive recording layer coating compositions from C9 to C13.

Table B summarizes the different combinations & compositions used.

Application example C14: preparation of a heat-sensitive recording layer coating compositions 15 g of dispersion C, 6.5 g of dispersion D, 11.5 g of dispersion E, 16 g of dispersion F, 19 g of a 10% by weight aqueous solution of a polyvinyl alcohol (Mowiol® 28-99, polyvinylalcohol, Kuraray Europe GmbH), 3 g of a 17% aqueous dispersion of zinc stearate (Hidorin® F115 from Chukyo Europe), 1.5 g of a 25% fatty acid amide emulsion (Hymicron L-271 from Chukyo Europe) and 43 g of distilled water were mixed and stirred to obtain a heat sensitive recording layer coating composition.

A base paper coated with calcined kaolin (Ansilex® 93 from BASF SE, coating weight 7 g/m$^2$) was coated with the above heat sensitive recording layer coating composition using an adapted wire bar (#4) to reach a dry color former coating weight of 0.25 g/m$^2$ and dried with hot air blower. This coated thermosensitive sheet is stored at 40° C. during 24 hours. The resulting heat sensitive recording layer coating composition was calendered with 25 kN with 2 passes, in order to obtain a smooth surface.

TABLE B

| | Thermal solution (parts by mass) | | | | | | |
|---|---|---|---|---|---|---|---|
| | C8 | C9 | C10 | C11 | C12 | C13 | C14 |
| Dispersion solution of color developer A (solution A) | 150 | 120 | 90 | 75 | 60 | 30 | 0 |
| Dispersion solution of color developer B (solution B) | | | | | | | |
| Dispersion solution of color developer C (solution C) | 0 | 30 | 60 | 75 | 90 | 120 | 150 |
| Dispersion solution of color former (solution D) | 65 | 65 | 65 | 65 | 65 | 65 | 65 |
| Dispersion solution of sensitizer (solution E) | 115 | 115 | 115 | 115 | 115 | 115 | 115 |
| Dispersion solution of PCC (solution F) | 160 | 160 | 160 | 160 | 160 | 160 | 160 |
| 25% Aqueous Wax emulsion | 15 | 15 | 15 | 15 | 15 | 15 | 15 |
| 17% Aqueous zinc stearate emulsion | 30 | 30 | 30 | 30 | 30 | 30 | 30 |
| 10% Aqueous solution of polyvinyl alcohol | 190 | 190 | 190 | 190 | 190 | 190 | 190 |
| Color former dry coating weight (g/m$^2$) | 0.25 | 0.25 | 0.25 | 0.25 | 0.25 | 0.25 | 0.25 |

Evaluation of Heat Sensitive Recording Materials

Dynamic Sensitivity:

The heat sensitive recording materials prepared according to embodiments herein were evaluated as described below and the results of the evaluations are summarized in Table C.

This evaluation consists to print a thermal image pattern with a gradual energy conditions per surface unit, and in dynamic conditions, it means with a certain printing speed, with a preferred range from 100 to 300 mm/s.

In current example, used Thermal printing tester is Atlantek Model 400 (manufactured by Atlantek Inc.), and each heat sensitive recording material was printed by simulating a speed of 100 mm/s with gradual printing energy per pattern as below:

3.217 −4.623 −6.065 −7.489 −8.876 −10.318 −11.742 −13.166 −14.571 −15.995 mJ/mm$^2$.

Thus obtained printed patterns will be evaluated by measuring optical density (black filter), [O.D], with a X-Rite/GretagMacbeth™ Eyeone pro densitometer.

Higher O.D., with a fixed energy & speed conditions, means higher dynamic image sensitivity.

Background

The Optical Density (O.D.) of the unrecorded surface of the coated substrate is measured with a Eye One densitometer from X-Rite/Gretag-Macbeth.

Water Resistance:

After thermal printing, the coated substrate is immersed in de-ionized water at 20° C. for 24 Hrs. After this treatment, the sample is maintained at room temperature during the time necessary to be completely dry. Then, the O.D. of the image and the background are measured using a Eye One densitometer from X-Rite/Gretag-Macbeth.

TABLE C

| | | Printing Energy—mJ/mm$^2$ | | | | | | | | | | | Sensitivity Calculation: Energy vs O.D. | | | | |
|---|---|---|---|---|---|---|---|---|---|---|---|---|---|---|---|---|---|
| | | 0.00 | 3.22 | 4.62 | 6.07 | 7.49 | 8.88 | 10.32 | 11.74 | 13.17 | 14.57 | 16.00 | Sen. O.D. = 1.00 | RATIO | Sen. O.D. = 1.20 | RATIO | Max. O.D. |
| C1 | PF425 = 100%/ NKK = 0% | 0.06 | 0.06 | 0.09 | 0.30 | 0.66 | 0.93 | 1.14 | 1.27 | 1.31 | 1.35 | 1.35 | 9.357 | 1.000 | 10.975 | 1.000 | 1.35 |
| C2 | PF425 = 80%/ NKK = 20% | 0.07 | 0.07 | 0.17 | 0.52 | 0.92 | 1.22 | 1.27 | 1.33 | 1.37 | 1.38 | 1.38 | 7.859 | 1.191 | 8.784 | 1.250 | 1.38 |
| C3 | PF425 = 60%/ NKK = 40% | 0.06 | 0.08 | 0.17 | 0.55 | 0.96 | 1.25 | 1.32 | 1.34 | 1.38 | 1.39 | 1.39 | 7.592 | 1.232 | 8.619 | 1.273 | 1.39 |
| C4 | PF425 = 50%/ NKK = 50% | 0.07 | 0.07 | 0.19 | 0.54 | 1.05 | 1.29 | 1.34 | 1.37 | 1.41 | 1.42 | 1.42 | 7.349 | 1.273 | 8.356 | 1.313 | 1.42 |
| C5 | PF425 = 40%/ NKK = 60% | 0.06 | 0.06 | 0.19 | 0.55 | 1.04 | 1.26 | 1.34 | 1.39 | 1.41 | 1.42 | 1.40 | 7.373 | 1.269 | 8.498 | 1.292 | 1.42 |
| C6 | PF425 = 20%/ NKK = 80% | 0.07 | 0.07 | 0.18 | 0.59 | 1.05 | 1.28 | 1.34 | 1.37 | 1.41 | 1.42 | 1.38 | 7.334 | 1.278 | 8.394 | 1.308 | 1.42 |
| C7 | PF425 = 0%/ NKK = 100% | 0.06 | 0.07 | 0.18 | 0.53 | 1.01 | 1.30 | 1.35 | 1.38 | 1.41 | 1.43 | 1.41 | 7.459 | 1.254 | 8.398 | 1.307 | 1.43 |

| | | Printing Energy—mJ/mm$^2$ | | | | | | | | | | | Sensitivity Calculation: Energy vs O.D. | | | | |
|---|---|---|---|---|---|---|---|---|---|---|---|---|---|---|---|---|---|
| | | 0.00 | 3.22 | 4.62 | 6.07 | 7.49 | 8.88 | 10.32 | 11.74 | 13.17 | 14.57 | 16.00 | Sen. O.D. = 1.00 | RATIO | Sen. O.D. = 1.20 | RATIO | Max. O.D. |
| C8 | PF425 = 100%/ PF201 = 0% | 0.06 | 0.06 | 0.11 | 0.30 | 0.58 | 0.84 | 1.05 | 1.17 | 1.24 | 1.28 | 1.29 | 9.975 | 1.000 | 12.352 | 1.000 | 1.29 |
| C9 | PF425 = 80%/ PF201 = 20% | 0.09 | 0.10 | 0.23 | 0.48 | 0.75 | 0.96 | 1.10 | 1.20 | 1.25 | 1.26 | 1.29 | 9.288 | 1.074 | 11.742 | 1.052 | 1.29 |
| C10 | PF425 = 60%/ PF201 = 40% | 0.11 | 0.12 | 0.25 | 0.58 | 0.88 | 1.10 | 1.18 | 1.28 | 1.30 | 1.30 | 1.32 | 8.246 | 1.210 | 10.603 | 1.165 | 1.32 |
| C11 | PF425 = 50%/ PF201 = 50% | 0.12 | 0.14 | 0.27 | 0.58 | 0.95 | 1.11 | 1.20 | 1.29 | 1.31 | 1.32 | 1.32 | 7.922 | 1.259 | 10.318 | 1.197 | 1.32 |
| C12 | PF425 = 40%/ PF201 = 60% | 0.12 | 0.13 | 0.26 | 0.68 | 0.97 | 1.14 | 1.27 | 1.33 | 1.36 | 1.38 | 1.39 | 7.734 | 1.290 | 9.542 | 1.295 | 1.39 |
| C13 | PF425 = 20%/ PF201 = 80% | 0.12 | 1.13 | 0.30 | 0.70 | 1.01 | 1.24 | 1.32 | 1.36 | 1.37 | 1.40 | 1.42 | 7.443 | 1.340 | 8.635 | 1.431 | 1.42 |
| C14 | PF425 = 0%/ PF201 = 100% | 0.11 | 0.12 | 0.29 | 0.74 | 1.07 | 1.25 | 1.33 | 1.36 | 1.38 | 1.40 | 1.41 | 7.187 | 1.388 | 8.491 | 1.455 | 1.41 |

Image & Background Stability:

The Optical Density (O.D.) of the thermal printed image and background whiteness of the non-thermal printed area of the media are measured before and after exposure to ageing test.

Lower is the gap of Optical Density (O.D.) between initial level and after ageing level, Higher is thermosensitive media stability.

Image Optical Density (O.D.)

Using a Thermal Tester (Atlantek Model 400 manufactured by Atlantek Inc.), each heat sensitive recording material was printed at an applied energy of 16 mJ/mm$^2$ to 100 mm/s and the density of the recorded image thus obtained was measured with a X-Rite/GretagMacbeth™ Eyeone pro densitometer.

Remaining Image ratio is evaluated according to the following calculation method:

Remaining ratio (%)=(O.D. after Water resistance test)/(O.D. of non-treated material)×100

Plasticizer Face Resistance:

After thermal printing, the «Face side» of the coated substrate where the printed image is recorded, is put in close contact with a sheet of PVC wrapping film (containing phthalate ester-type plasticizer) from Global Plastics Co., under 50 g/cm-2 pressure for 24 Hrs at 40° C.

After this treatment, PVC film is removed from the face surface, and the sample is maintained at room temperature during hr.

Then, the O.D. of the image and the background are measured using a Eye One densitometer from X-Rite/Gretag-Macbeth, within 8 hrs after removal of the PVC film. Remaining Image ratio is evaluated according to the following calculation method:

Remaining ratio (%) (O.D. after Plasticizer Face resistance test)/(O.D. of non-treated material)×100.

Oil Resistance:

After thermal printing, 0.05 ml of cotton seed oil is applied uniformly onto the face side of the coated substrate and the sample is maintained at 40° C. for 24 hours.

After this treatment, the O.D. of the image and the background are measured using an Eye One densitometer from X-Rite/Gretag-Macbeth.

Remaining Image ratio is evaluated according to the following calculation method:

Remaining ratio (%)=(O.D. after Oil resistance test)/(O.D. of non-treated material)×100

Heat Resistance:

After thermal printing, the coated substrate is placed in a dry oven at 90° C. for 1 hour. After this treatment, the sample is maintained at room temperature during 1 Hour. Then, the O.D. of the image and the background are measured using an Eye One densitometer from X-Rite/Gretag-Macbeth. Remaining Image ratio is evaluated according to the following calculation method:

Remaining ratio (%)=(O.D. after Heat resistance test)/(O.D. of non-treated material)×100 Results of Image & Background stability of tested thermosensitive papers

| | | PF425 = 100% NKK1304 = 0% C1 | PF425 = 80% NKK1304 = 20% C2 | PF425 = 60% NKK1304 = 40% C3 | PF425 = 50% NKK1304 = 50% C4 | PF425 = 40% NKK1304 = 60% C.5 | PF425 = 20% NKK1304 = 80% C6 | PF425 = 0% NKK1304 = 100% C7 |
|---|---|---|---|---|---|---|---|---|
| BEFORE TEST | OD | 1.33 | 1.38 | 1.41 | 1.42 | 1.42 | 1.38 | 1.42 |
| | BG | 0.06 | 0.07 | 0.07 | 0.06 | 0.07 | 0.06 | 0.08 |
| Water | OD | 1.19 | 1.12 | 1.16 | 1.14 | 1.08 | 1.01 | 0.96 |
| 24 H/20° C. | BG | 0.07 | 0.07 | 0.07 | 0.06 | 0.06 | 0.07 | 0.06 |
| | Rem. Ratio | 89% | 81% | 82% | 80% | 76% | 73% | 68% |
| Plasticizer Face | OD | 0.15 | 0.97 | 1.05 | 1.20 | 1.15 | 1.06 | 0.10 |
| 24 H/40° C.—PVC | BG | 0.05 | 0.05 | 0.05 | 0.06 | 0.06 | 0.06 | 0.05 |
| | Rem. Ratio | 11% | 70% | 74% | 85% | 81% | 77% | 7% |
| Oil/Cotton | OD | 1.28 | 1.32 | 1.34 | 1.42 | 1.38 | 1.39 | 0.13 |
| 24 H/40° C. | BG | 0.10 | 0.09 | 0.10 | 0.11 | 0.08 | 0.11 | 0.07 |
| | Rem. Ratio | 96% | 96% | 95% | 100% | 97% | 101% | 9% |

TABLE E

| | | PF425 = 100% PF201 = 0% C8 | PF425 = 80% PF201 = 20% C9 | PF425 = 60% PF201 = 40% C10 | PF425 = 50% PF201 = 50% C11 | PF425 = 40% PF201 = 60% C12 | PF425 = 20% PF201 = 80% C13 | PF425 = 0% PF201 = 100% C14 |
|---|---|---|---|---|---|---|---|---|
| BEFORE TEST | OD | 1.31 | 1.32 | 1.34 | 1.37 | 1.40 | 1.42 | 1.42 |
| | BG | 0.07 | 0.10 | 0.12 | 0.12 | 0.10 | 0.12 | 0.11 |
| Water | OD | 1.02 | 1.02 | 1.05 | 0.99 | 0.99 | 0.96 | 0.71 |
| 24 H/20° C. | BG | 0.11 | 0.09 | 0.07 | 0.06 | 0.06 | 0.06 | 0.07 |
| | Rem. Ratio | 78% | 77% | 78% | 72% | 71% | 68% | 50% |
| Plasticizer Face | OD | 0.44 | 0.64 | 0.69 | 0.74 | 0.76 | 0.84 | 0.86 |
| 24 H/40° C.—PVC | BG | 0.06 | 0.06 | 0.07 | 0.07 | 0.06 | 0.07 | 0.07 |
| | Rem. Ratio | 34% | 48% | 51% | 54% | 54% | 59% | 61% |
| Oil/Cotton | OD | 1.04 | 1.15 | 1.20 | 1.26 | 1.36 | 1.36 | 1.36 |
| 24 H/20° C. | BG | 0.11 | 0.13 | 0.14 | 0.13 | 0.14 | 0.16 | 0.14 |
| | Rem. Ratio | 79% | 87% | 90% | 92% | 97% | 96% | 96% |
| Heat dry | OD | 1.12 | 1.16 | 1.23 | 1.26 | 1.34 | 1.34 | 1.23 |
| 1 H/90° C. | BG | 0.10 | 0.23 | 0.46 | 0.65 | 0.69 | 0.83 | 0.85 |
| | Rem. Ratio | 85% | 88% | 92% | 92% | 96% | 94% | 87% |

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A heat sensitive recording material, comprising:

a) a color forming compound;

b) a first non-phenolic color developer of the formula (I)

(I)

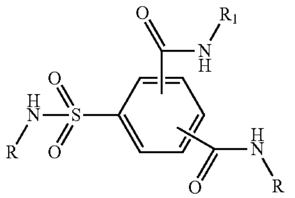

wherein R and R1 are each, independently of each other, hydrogen; $C_1$-$C_{18}$-alkyl; $C_1$-$C_8$-alkoxy-$C_1$-$C_8$-alkyl; $(R_9)_2N$—$C_1$-$C_8$-alkyl, wherein $R_9$ stands for $C_1$-$C_8$-alkyl or $C_5$-$C_6$-cycloalkyl; or a radical of formula (II)

(II)

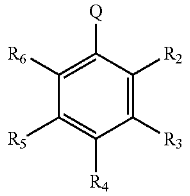

wherein $R_2$, $R_3$, $R_4$, $R_5$, $R_6$ are each, independently of each other, hydrogen; $C_1$-$C_8$-alkyl; —NH—C(═O)—$R_7$ or —C(═O)—NH—$R_7$, wherein $R_7$ stands for $C_1$-$C_8$-alkyl; —C(═O)O$R_8$, wherein $R_8$ stands for $C_1$-$C_8$-alkyl; halogen; or wherein $R_2$ and $R_3$, or $R_4$ and $R_5$ or both, or wherein $R_3$ and $R_4$, or $R_5$ and $R_6$ or both, or wherein $R_2$ and $R_3$ and $R_5$ and $R_6$, stand together for a hydrocarbon diradical with three or four carbon atoms, and wherein Q stands for a single bond or $C_1$-$C_8$-alkylene, which can be branched or unbranched, and wherein the $C_1$-$C_8$-alkylene includes a main chain containing one or more oxygen atoms between two carbon atoms when the $C_1$-$C_8$-alkylene includes more than two carbon atoms, and wherein at least one of R or R1 is a radical of formula (II); and c) a second non-phenolic color developer.

2. The heat sensitive recording material of claim 1, wherein the second non-phenolic color developer is a compound selected from the group consisting of:

(i) a compound represented by the following formula (N-I):

(N-I)

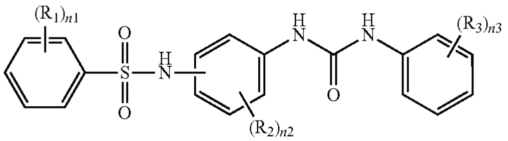

where:

$R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$alkenyl group, a $C_1$-$C_6$ fluoroalkyl group, a $N(R_4)_2$ group, $NHCOR_5$, an optionally substituted phenyl group, or an optionally substituted benzyl group;

$R_4$ represents a hydrogen atom, a phenyl group, a benzyl group, or a $C_1$-$C_6$alkyl group;

$R_5$ represents a $C_1$-$C_6$ alkyl group;

n1 and n3 each independently represents any integer of 1 to 5; and n2 represents any integer of 1 to 4;

(ii) a compound represented by the following formula (N-II):

(N-II)

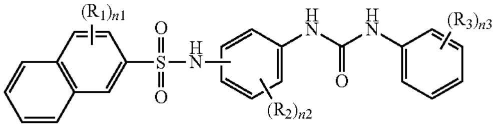

where:

$R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$alkenyl group, a $C_1$-$C_6$ fluoroalkyl group, a $N(R_4)_2$ group, $NHCOR_5$, an optionally substituted phenyl group, or an optionally substituted benzyl group;

n2 represents any integer of 1 to 4;

n3 represents any integer of 1 to 5; and n4 represents any integer of 1 to 7; and (iii) a compound represented by the following formula (N-III):

(N-III)

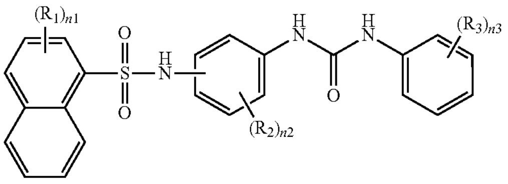

where $R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group, $NHCOR_5$, an optionally substituted phenyl group, or an optionally substituted benzyl group;

n2 represents any integer of 1 to 4;

n3 represents any integer of 1 to 5; and n4 represents any integer of 1 to 7.

3. The heat sensitive recording material of claim 2, wherein the formula (N-I) is the following formula (N-IV):

(N-IV)

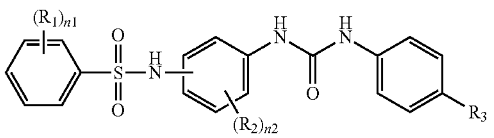

where Rand $R_3$ each independently represents a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group, $NHCOR_5$, an optionally substituted phenyl group, or an optionally substituted benzyl group.

4. The recording composition according to claim 2, wherein the formula (N-I) is the following formula (N-V):

(N-V)

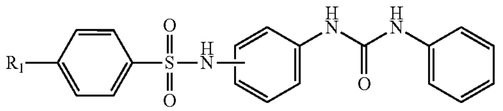

where $R_1$ represents a hydrogen atom, a halogen atom, a nitro group, a $C_1$-$C_6$ alkyl group, a $C_1$-$C_6$ alkoxyl group, a $C_2$-$C_6$alkenyl group, a $C_1$-$C_6$ fluoroalkyl group, a $N(R_4)_2$ group, $NHCOR_5$, an optionally substituted phenyl group, or an optionally substituted benzyl group.

5. The heat sensitive recording material of claim 1, wherein the second non-phenolic color developer is a compound of the formula (P-I)

(P-I)

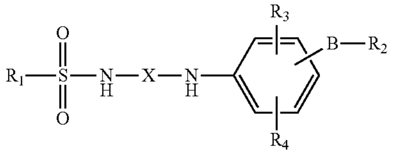

wherein

R1 is unsubstituted or substituted phenyl, or naphthyl,

R3 and R4 independently of each other are hydrogen, $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy, $C_1$-$C_8$ alkylsulphonyl, halogen, phenyl, phenoxy or phenoxycarbonyl, X is a group of the formula

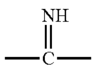 , 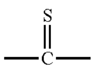 or 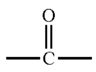

B is a linking group of formula —O—$SO_2$—, —$SO_2$—O—, —$SO_2$—NH—, or —CO—NH—$SO_2$—, and $R_2$ is phenyl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen;

or $R_2$ is naphthyl or benzyl, which is substituted by $C_1$-$C_4$ alkyl or halogen, with the proviso, that, if B is not a linking group of formula —O—$SO_2$—, then $R_2$ is unsubstituted or substituted phenyl, or naphthyl.

6. The heat sensitive recording material of claim 5 wherein, in the second color developer, R1 is phenyl, which is substituted by $C_1$-$C_4$ alkyl, and X is a group of the formula

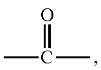,

R3 and R4 independently of each other are hydrogen, C1-C4 alkyl or halogen

B is a linking group of formula —O—$SO_2$—, and

R2 is phenyl, which is unsubstituted or substituted by C1-C4 alkyl.

7. The heat sensitive recording material of claim 1, wherein the second non-phenolic color developer is a compound of the formula (Q-I)

(Q-I)

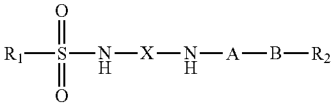

wherein $R_1$ is phenyl or naphthyl, which is unsubstituted or substituted by $C_1$-$C_8$ alkyl, $C_1$-$C_8$-alkoxy or halogen, or $R_1$ is $C_1$-$C_{20}$ alkyl, which can be unsubstituted or substituted by $C_1$-$C_8$-alkoxy or halogen;

X is a group of the formula

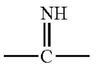 , 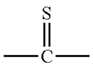 or 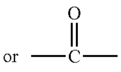

A is unsubstituted or substituted phenylene, naphthylene or $C_1$-$C_{12}$ alkylene, or is an unsubstituted or substituted heterocyclic group;

B is a linking group of formula —O—$SO_2$—, —$SO_2$—O—, —NH—$SO_2$—, —$SO_2$—NH—, —S—$SO_2$—, —O—CO—NH—, —NH—CO—, —NH—CO—O—, —S—CO—NH—, —S—CS—NH—, —CO—NH—$SO_2$—, —O—CO—NH—$SO_2$—, —NH=CH—, —CO—NH—CO—, —S—, —CO—, —O—, —$SO_2$—NH—CO—, —O—CO—O—, or —O—PO—$(OR_2)_2$; and $R_2$ is aryl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen;

or $R_2$ is benzyl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen, or $R_2$ is $C_1$-$C_{20}$ alkyl, which is unsubstituted or substituted by $C_1$-$C_8$ alkoxy, halogen, phenyl, or naphthyl, with the proviso, that, if B is not a linking group of formula —O—$SO_2$—, then $R_2$ is unsubstituted or substituted phenyl, naphthyl, or $C_1$-$C_8$ alkyl and that, if B is —O—, then $R_2$ is not alkyl, and with the further proviso that, if B stands for —O—$SO_2$— or —$SO_2$—O—, then $R_2$ is not $C_1$-$C_{20}$ alkyl.

8. The heat sensitive recording material of claim 7, wherein $R_1$ is phenyl, which is unsubstituted or substituted by $C_1$-$C_8$ alkyl, $C_1$-$C_8$-alkoxy or halogen.

9. The heat sensitive recording material of claim 7, wherein $R_1$ is phenyl, which is substituted by $C_1$-$C_8$ alkyl, $C_1$-$C_8$-alkoxy or halogen.

10. The heat sensitive recording material of claim 7, wherein $R_1$ is phenyl, which is substituted by $C_1$-$C_4$ alkyl.

11. The heat sensitive recording material of claim 7, wherein X is a group of the

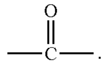

12. The heat sensitive recording material of claim 1 wherein the heat sensitive recording material has a first non-phenolic color developer to second non-phenolic color developer ratio of from 10:90 to 90:10, in dry proportion of each non-phenolic color developer.

13. The heat sensitive recording material of claim 1 wherein the heat sensitive recording material has a first non-phenolic color developer to second non-phenolic color developer ratio of from 20:80 to 60:40, in dry proportion of each non-phenolic color developer.

14. A heat sensitive recording material, comprising:

a) a color forming compound;

b) a first non-phenolic color developer of the formula (I)

(I)

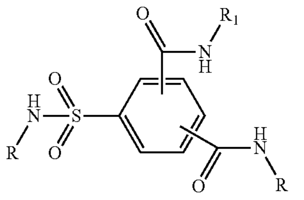

wherein R and R1 are each, independently of each other, hydrogen; $C_1$-$C_{18}$-alkyl; $C_1$-$C_8$-alkoxy-$C_1$-$C_8$-alkyl; $(R_9)_2N$—$C_1$-$C_8$-alkyl, wherein $R_9$ stands for $C_1$-$C_8$-alkyl or $C_5$-$C_6$-cycloalkyl; or a radical of formula (II)

(II)

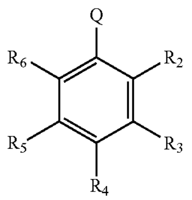

wherein $R_2$, $R_3$, $R_4$, $R_5$, $R_6$ are each, independently of each other, hydrogen; $C_1$-$C_8$-alkyl; —NH—C(═O)—$R_7$ or —C(═O)—NH—$R_7$, wherein $R_7$ stands for $C_1$-$C_8$-alkyl;

—C(═O)O$R_8$, wherein $R_8$ stands for $C_1$-$C_8$-alkyl; halogen; or wherein $R_2$ and $R_3$, or $R_4$ and $R_5$ or both, or wherein $R_3$ and $R_4$, or $R_5$ and $R_6$ or both, or wherein $R_2$ and $R_3$ and $R_5$ and $R_6$, stand together for a hydrocarbon diradical with three or four carbon atoms, and wherein Q stands for a single bond or $C_1$-$C_8$-alkylene, which can be branched or unbranched, and wherein the $C_1$-$C_8$-alkylene includes a main chain containing one or more oxygen atoms between two carbon atoms when the $C_1$-$C_8$-alkylene includes more than two carbon atoms;

c) a second non-phenolic color developer; and d) at least one sensitizer selected from the group consisting of benzyl 2-naphthyl ether, stearamide, methylol stearamide, p-benzylbiphenyl, m-terphenyl, 2-benzyloxynaphthalene, 4-methoxybiphenyl, dibenzyl oxalate, di(4-methylbenzyl) oxalate, di(4-chlorobenzyl) oxalate, dimethyl phthalate, dibenzyl terephthalate, dibenzyl isophthalate, 1,2-diphenoxyethane, 1,2-bis(4-methylphenoxy) ethane, 1,2-bis(3-methylphenoxy)ethane, 4,4'-dimethylbiphenyl, phenyl-1-hydroxy-2-naphthoate, 4-methylphenyl biphenyl ether, 1,2-bis(3,4-dimethylphenyl) ethane, 2,3,5,6-4'-methyldiphenyl methane, 1,4-diethoxy-naphthalene, 1,4-diacetoxybenzene, 1,4-dipropionoxybenzene, o-xylylene-bis(phenyl ether), 4-(m-methylphenoxymethyl) biphenyl, p-hydroxyacetanilide, p-hydroxybutyranilide, p-hydroxynonananilide, p-hydroxylauranilide, p-hydroxyoctadecananilide, N-phenyl-phenylsulphonamide and sensitizers of the formula

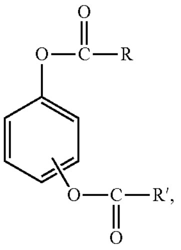

wherein R and R' are identical or different from each other and each represent a $C_1$-$C_6$ alkyl.

15. A recording sheet comprising:

a support, and a recording composition layer on the support, wherein the recording composition is formed from:

a) at least a color forming compound;

b) a first non-phenolic color developer of the formula (I)

(I)

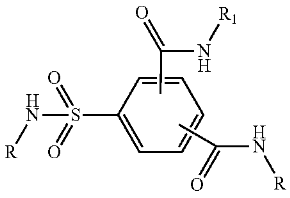

wherein R and R1 are each independently of each other hydrogen, $C_1$-$C_{18}$-alkyl, $C_1$-$C_8$-alkoxy-$C_1$-$C_8$-alkyl, $(R_9)_2N$—$C_1$-$C_8$-alkyl, wherein $R_9$ stands for $C_1$-$C_8$-alkyl or $C_5$-$C_6$-cycloalkyl, or a radical of formula (II)

(II)

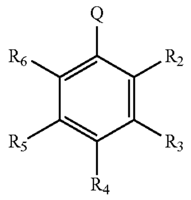

wherein $R_2$, $R_3$, $R_4$, $R_5$, $R_6$ are each independently of each other hydrogen, $C_1$-$C_8$-alkyl, —NH—C(═O)—$R_7$, —C(═O)—NH—$R_7$, wherein $R_7$ stands for $C_1$-$C_8$-alkyl, —C(═O)O$R_8$, wherein $R_8$ stands for $C_1$-$C_8$-alkyl, halogen, or wherein $R_2$ and $R_3$, or $R_4$ and $R_5$ or both, or wherein $R_3$ and $R_4$, or $R_5$ and $R_6$ or both, or wherein $R_2$ and $R_3$ and $R_5$ and $R_6$, stand together for a hydrocarbon diradical with three or four carbon atoms, wherein Q stands for a single bond or $C_1$-$C_8$-alkylene, which can be branched or unbranched, and wherein the $C_1$-$C_8$-alkylene includes a main chain containing one or more oxygen atoms between two carbon atoms when the $C_1$-$C_8$-alkylene includes more than 2 carbon atoms, and wherein at least one of R or $R_1$ is a radical of formula (II); and c) a second non-phenolic color developer.

16. The recording sheet of claim 15, wherein the second non-phenolic color developer is a compound selected from the group consisting of:

(i) a compound represented by the following formula (N-I):

(N-I)

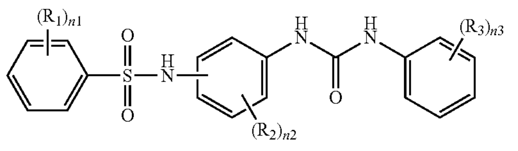

where:

$R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$alkenyl group, a $C_1$-$C_6$ fluoroalkyl group, a $N(R_4)_2$ group, $NHCOR_5$, an optionally substituted phenyl group, or an optionally substituted benzyl group;

$R_4$ represents a hydrogen atom, a phenyl group, a benzyl group, or a $C_1$-$C_6$alkyl group;

$R_5$ represents a $C_1$-$C_6$ alkyl group;

n1 and n3 each independently represents any integer of 1 to 5; and n2 represents any integer of 1 to 4;

(ii) a compound represented by the following formula (N-II):

(N-II)

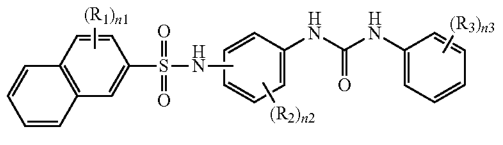

where:

$R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$alkenyl group, a $C_1$-$C_6$ fluoroalkyl group, a $N(R_4)_2$ group, $NHCOR_5$, an optionally substituted phenyl group, or an optionally substituted benzyl group;

n2 represents any integer of 1 to 4;

n3 represents any integer of 1 to 5; and n4 represents any integer of 1 to 7; and (iii) a compound represented by the following formula (N-III):

(N-III)

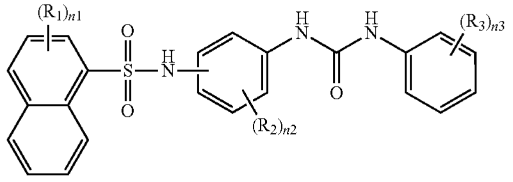

where $R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group, $NHCOR_5$, an optionally substituted phenyl group, or an optionally substituted benzyl group;

n2 represents any integer of 1 to 4;

n3 represents any integer of 1 to 5; and n4 represents any integer of 1 to 7.

17. The recording sheet of claim 15, wherein the second non-phenolic color developer is a compound of the formula (P-I)

(P-I)

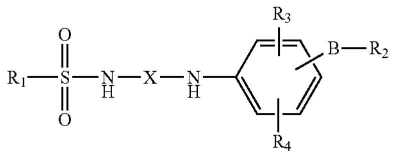

wherein

R1 is unsubstituted or substituted phenyl, or naphthyl,

R3 and R4 independently of each other are hydrogen, $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy, $C_1$-$C_8$ alkylsulphonyl, halogen, phenyl, phenoxy or phenoxycarbonyl, X is a group of the formula

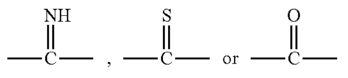

B is a linking group of formula —O—$SO_2$—, —$SO_2$—O—, —$SO_2$—NH—, or —CO—NH—$SO_2$—, and $R_2$ is phenyl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen;

or $R_2$ is naphthyl or benzyl, which is substituted by $C_1$-$C_4$ alkyl or halogen, with the proviso, that, if B is not a linking group of formula —O—$SO_2$—, then $R_2$ is unsubstituted or substituted phenyl, or naphthyl.

18. The recording sheet of claim 15, wherein the second non-phenolic color developer is a compound of the formula (Q-I)

(Q-I)

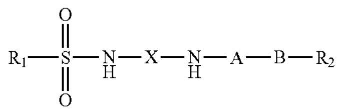

wherein $R_1$ is phenyl or naphthyl, which is unsubstituted or substituted by $C_1$-$C_8$ alkyl, $C_1$-$C_8$-alkoxy or halogen, or $R_1$ is $C_1$-$C_{20}$ alkyl, which can be unsubstituted or substituted by $C_1$-$C_8$-alkoxy or halogen;

X is a group of the formula

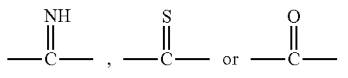

A is unsubstituted or substituted phenylene, naphthylene or $C_1$-$C_{12}$ alkylene, or is an unsubstituted or substituted heterocyclic group;

B is a linking group of formula —O—$SO_2$—, —$SO_2$—O—, —NH—$SO_2$, —$SO_2$—NH—, —S—$SO_2$—, —O—CO—NH—, —NH—CO—, —NH—CO—O—, —S—CO—NH—, —S—CS—NH—, —CO—NH—$SO_2$—, —O—CO—NH—$SO_2$—, —NH═CH—, —CO—NH—CO—, —S—, —CO—, —O—, —$SO_2$—NH—CO—, —O—CO—O—, or —O—PO—$(OR_2)_2$; and $R_2$ is aryl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen;

or $R_2$ is benzyl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen, or $R_2$ is $C_1$-$C_{20}$ alkyl, which is unsubstituted or substituted by $C_1$-$C_8$ alkoxy, halogen, phenyl, or naphthyl, with the proviso, that, if B is not a linking group of formula —O—$SO_2$—, then $R_2$ is unsubstituted or substituted phenyl, naphthyl, or $C_1$-$C_8$ alkyl and that, if B is —O—, then $R_2$ is not alkyl, and with the further proviso that, if B stands for —O—$SO_2$— or —$SO_2$—O—, then $R_2$ is not $C_1$-$C_{20}$ alkyl.

19. A recording sheet comprising:

a support, and a recording composition layer on the support, wherein the recording composition is formed from:

a) at least a color forming compound;

b) a first non-phenolic color developer of the formula (I)

(I)

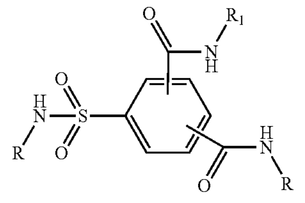

wherein R and $R_1$ are each independently of each other hydrogen, $C_1$-$C_{18}$-alkyl, $C_1$-$C_8$-alkoxy-$C_1$-$C_8$-alkyl, $(R_9)_2N$—$C_1$-$C_8$-alkyl, wherein $R_9$ stands for $C_1$-$C_8$-alkyl or $C_5$-$C_6$-cycloalkyl, or a radical of formula (II)

(II)

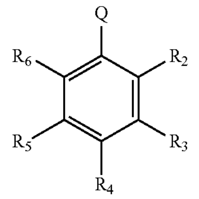

wherein $R_2$, $R_3$, $R_4$, $R_5$, $R_6$ are each independently of each other hydrogen, $C_1$-$C_8$-alkyl, —NH—C(═O)—$R_7$, —C(═O)—NH—$R_7$, wherein $R_7$ stands for $C_1$-$C_8$-alkyl, —C(═O)$OR_8$, wherein $R_8$ stands for $C_1$-$C_8$-alkyl, halogen, or wherein $R_2$ and $R_3$, or $R_4$ and $R_5$ or both, or wherein $R_3$ and $R_4$, or $R_5$ and $R_6$ or both, or wherein $R_2$ and $R_3$ and $R_5$ and $R_6$, stand together for a hydrocarbon diradical with three or four carbon atoms, and wherein Q stands for a single bond or $C_1$-$C_8$-alkylene, which can be branched or unbranched, and wherein the $C_1$-$C_8$-alkylene includes a main chain containing one or more oxygen atoms between two carbon atoms when the $C_1$-$C_8$-alkylene includes more than 2 carbon atoms; and c) a second non-phenolic color developer, wherein (A) the second non-phenolic color developer is a compound selected from the group consisting of:

(i) a compound represented by the following formula (N-I):

(N-I)

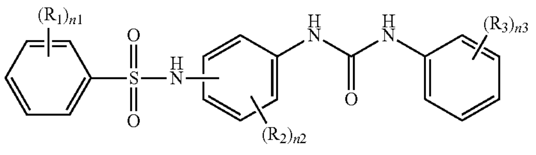

where:

$R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$alkenyl group, a $C_1$-$C_6$ fluoroalkyl group, a $N(R_4)_2$ group, $NHCOR_5$, an optionally substituted phenyl group, or an optionally substituted benzyl group;

$R_4$ represents a hydrogen atom, a phenyl group, a benzyl group, or a $C_1$-$C_6$alkyl group;

$R_5$ represents a $C_1$-$C_6$ alkyl group;

n1 and n3 each independently represents any integer of 1 to 5; and n2 represents any integer of 1 to 4;

(ii) a compound represented by the following formula (N-II):

(N-II)

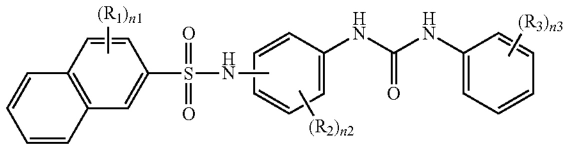

where:

$R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$alkenyl group, a $C_1$-$C_6$ fluoroalkyl group, a $N(R_4)_2$ group, $NHCOR_5$, an optionally substituted phenyl group, or an optionally substituted benzyl group;

n2 represents any integer of 1 to 4;

n3 represents any integer of 1 to 5; and n4 represents any integer of 1 to 7; and (iii) a compound represented by the following formula (N-III):

(N-III)

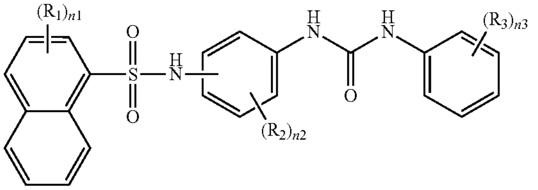

where $R_1$, $R_2$, and $R_3$ each independently represents a hydrogen atom, a halogen atom, a nitro group, a $C_1$-$C_6$ alkyl group, a $C_1$-$C_6$ alkoxyl group, a $C_2$-$C_6$ alkenyl group, a $C_1$-$C_6$ fluoroalkyl group, a $N(R_4)_2$ group, $NHCOR_5$, an optionally substituted phenyl group, or an optionally substituted benzyl group;

n2 represents any integer of 1 to 4;

n3 represents any integer of 1 to 5; and n4 represents any integer of 1 to 7; or (B) the second non-phenolic color developer is a compound of the formula (P-I)

(P-1)

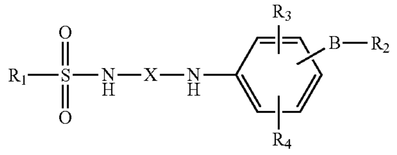

wherein

R1 is unsubstituted or substituted phenyl, or naphthyl,

R3 and R4 independently of each other are hydrogen, $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy, $C_1$-$C_8$ alkylsulphonyl, halogen, phenyl, phenoxy or phenoxycarbonyl, X is a group of the formula

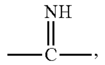, 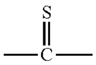 or 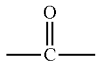

B is a linking group of formula —O—$SO_2$—, —$SO_2$—O—, —$SO_2$—NH—, or —CO—NH—$SO_2$—, and $R_2$ is phenyl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen;

or $R_2$ is naphthyl or benzyl, which is substituted by $C_1$-$C_4$ alkyl or halogen, with the proviso, that, if B is not a linking group of formula —O—$SO_2$—, then $R_2$ is unsubstituted or substituted phenyl, or naphthyl; or (C) the second non-phenolic color developer is a compound of the formula (Q-I)

(Q-1)

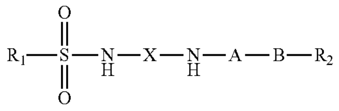

wherein $R_1$ is phenyl or naphthyl, which is unsubstituted or substituted by $C_1$-$C_8$ alkyl, $C_1$-$C_8$-alkoxy or halogen, or $R_1$ is $C_1$-$C_{20}$ alkyl, which can be unsubstituted or substituted by $C_1$-$C_8$-alkoxy or halogen;

X is a group of the formula

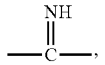, 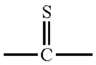 or 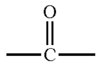

A is unsubstituted or substituted phenylene, naphthylene or $C_1$-$C_{12}$ alkylene, or is an unsubstituted or substituted heterocyclic group;

B is a linking group of formula —O—$SO_2$—, —$SO_2$—O—, —NH—$SO_2$—, —$SO_2$—NH—, —S—$SO_2$—, —O—CO—NH—, —NH—CO—, —NH—CO—O—, —S—CO—NH—, —S—CS—NH—, —CO—NH—$SO_2$—, —O—CO—NH—$SO_2$—, —NH=CH—, —CO—NH—CO—, —S—, —CO—, —O—, —$SO_2$—NH—CO—, —O—CO—O—, or —O—PO—$(OR_2)_2$; and $R_2$ is aryl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen;

or $R_2$ is benzyl, which is unsubstituted or substituted by $C_1$-$C_8$ alkyl, halogen-substituted $C_1$-$C_8$ alkyl, $C_1$-$C_8$ alkoxy-substituted $C_1$-$C_8$ alkyl, $C_1$-$C_8$ alkoxy, halogen-substituted $C_1$-$C_8$ alkoxy or halogen, or $R_2$ is $C_1$-$C_{20}$ alkyl, which is unsubstituted or substituted by $C_1$-$C_8$ alkoxy, halogen, phenyl, or naphthyl, with the proviso, that, if B is not a linking group of formula —O—$SO_2$—, then $R_2$ is unsubstituted or substituted phenyl, naphthyl, or $C_1$-$C_8$ alkyl and that, if B is —O—, then $R_2$ is not alkyl, and with the further proviso that, if B stands for —O—$SO_2$— or —$SO_2$—O—, then $R_2$ is not $C_1$-$C_{20}$ alkyl.

* * * * *